(12) United States Patent
Allen et al.

(10) Patent No.: US 7,512,526 B2
(45) Date of Patent: Mar. 31, 2009

(54) SYSTEM AND METHOD FOR DYNAMIC RUNTIME HLA-FEDERATION-EXECUTION DATA DISPLAY

(75) Inventors: Stanley R. Allen, League City, TX (US); Lindy A. Johnson, Webster, TX (US); Earle C. Powdrell, Friendswood, TX (US)

(73) Assignee: Raytheon Company, Waltham, MA (US)

( * ) Notice: Subject to any disclaimer, the term of this patent is extended or adjusted under 35 U.S.C. 154(b) by 437 days.

(21) Appl. No.: 11/065,615

(22) Filed: Feb. 24, 2005

(65) Prior Publication Data

US 2005/0193367 A1  Sep. 1, 2005

Related U.S. Application Data

(60) Provisional application No. 60/549,012, filed on Mar. 1, 2004.

(51) Int. Cl.
*G06F 7/60* (2006.01)
*G06F 17/10* (2006.01)
*G06F 9/44* (2006.01)
*G06F 9/45* (2006.01)

(52) U.S. Cl. ............................ 703/2; 703/6; 717/125; 717/127; 717/135; 717/167

(58) Field of Classification Search ............... 703/2, 703/6; 717/125, 127, 135, 165, 167
See application file for complete search history.

(56) References Cited

U.S. PATENT DOCUMENTS 5,748,881 A * 5/1998 Lewis et al. ................. 714/47

5,930,154 A   7/1999 Thalhammer-Reyero

OTHER PUBLICATIONS

Chad F. Salisbury, Steven D. Farr, Jason A. Moore, "Web-Based Simulation Visualization Using Java3D" Proceedings of the 1999 Winter Simulation Conference, pp. 1425-1429.*
John Tufarolo, Jeff Nielsen, Susan Symington, Richard Weatherly, Annette Wilson, James Ivers, Timothy C. Hyon, "Automated Distributed System Testing: Designing an RTI Verification System", Proceedings of the 1999 Winter Simulation Conference, pp. 1094-1102.*
Roy Crosbie, John Zenor, "High Level Architecture Module 2 Advanced Topics" The Society for Computer Simulation, California State University, Chico, Sep. 16, 1999, pp. 1-27.*
Paul Snaith, "Complete Idiots Guide to C++" alpha books, A Pearson Education Company, ISBN 0-7897-1816-2, Nov. 1998, pp. 255-260.*
"HLA Module 1, Part 1: Introduction to the High Level Architecture" Lecture Notes from website http://72.14.207.104/search?q=cache:RgnXZ2oz7M0J.www.ecslcsuchlco.edu/-hla/LectureNotes/HLA__1.3NG__M1__P1.pdf+%22HLA+Module+1%22&hl=en; Feb. 15, 1999.

(Continued)

*Primary Examiner*—Paul L Rodriguez
*Assistant Examiner*—Dwin M Craig
(74) *Attorney, Agent, or Firm*—Daly, Crowley, Mofford & Durkee, LLP

(57) ABSTRACT

A dynamic runtime high level architecture (HLA) federation-execution data display allows a user to dynamically select HLA-federation-execution data to display while joined to an executing HLA federation.

29 Claims, 35 Drawing Sheets

OTHER PUBLICATIONS

"Experts in Modeling and Simulation;" AEgis Technologies; website http://www.aegistg.com/; printed Mar. 18, 2005.

"Fed Proxy:" website http://www.aegistg.com/labcut/lwProducts/RedProxy/fedproxy.htm; printed Mar. 18, 2005.

"Powerful Federation Management Tools . . . ," Virtual Technology Corporation: website http://virtc.com/Products/Index.jsp; printed Mar. 18, 2005.

"Leaders in Distributed Simulation;" Virtual Technology Corporation; website http://virtc.com; printed Mar. 18, 2005.

"RTI NG Pro™ version 2.0.4;" Virtual Technology Corporation; website http://virtc.com/Products/prdFulltext.jsp?ID=1a_RTI Jun. 1, 2005.

Greenlaw; "Distributed Simulation Tools;" Virtual Technology Corporation; Slide Show Presentation; Nov. 15, 2001.

hlaResults™, User's Guide, Version 2.2: Section 5.3; "Configuring an HLA Collector;" Virtual Technology Corporation; Jul. 2003.

hlaResults™, User's Guide, Version 2.2; Section 5.7; "Collecting HLA Data;" Virtual Technology Corporation; Jul. 2003.

Baude et al,; "IC2D: Interactive Control and Debugging of Distribution;" Springer-Verlag; vol. 2179, Jun. 2001; XP002356202; pp. 193-200.

Hall et al.; "Joint Measure: Distributed Simulation Issues in a Mission Effectiveness Analytic Simulator;" SIW, 'Online! 1999; XP002356201; pp. 1-7.

Peskin et al.; "Interactive Quantitative Visualization;" IBM J. Res. Develop.; vol. 35, No. 1/2; Jan./Mar. 1991; XP000262749; pp. 205-226.

Rausmussen et al.; "MultiUAV: A Multiple UAV Simulation for Investigation of Cooperative Control;" IEEE Proceedings of the 2002 Winter Simulation Conference; Dec. 8-11, 2002; XP010624041; pp. 869-877.

Reid; "An Evaluation of the High Level Architecture (HLA) as a Framework for NASA Modeling and Simulation;" 25th NASA Software Engineering Workshop; Nov. 30, 2000; XP002356200; pp. 1-9.

Sprenger et al.: "Ivory—An Object-Oriented Framework for Physics-Based Information Visualization in Java;" Proceedings, IEEE Symposium on Research Triangle: Oct. 19-20, 1998; XP010313306; pp. 79-86.

Telea; "Combining Object Orientation and Dataflow Modelling in the VISSION Simulation System;" Technology of Object-Oriented Languages and Systems; Jun. 7-10, 1999; XP010342438; pp. 56-65.

Tuchman et al.: "Run-Time Visualization of Program Data;" IEEE Conference on Visualization, Oct. 22, 1991; XP010024990; pp. 255-261.

PCT Search Report of the ISA for PCT/US2005/005736 dated Dec. 16, 2005.

Written Opinion of the ISA for PCT/US2005/005736 dated Dec. 16, 2005.

* cited by examiner

SYSTEM AND METHOD FOR DYNAMIC RUNTIME HLA-FEDERATION-EXECUTION DATA DISPLAY

CROSS REFERENCE TO RELATED APPLICATIONS

This application claims the benefit under 35 U.S.C. §119 (e) of U.S. Provisional Application No. 60/549,012 filed Mar. 1, 2004, which application is incorporated herein by reference in its entirety.

STATEMENT REGARDING FEDERALLY SPONSORED RESEARCH

Not Applicable.

FIELD OF THE INVENTION

This invention relates generally to a software simulation high level architecture (HLA) having a federation with federates and, in particular, to systems and methods that allow a user to view data associated with objects models within the federation as an HLA federation executes.

BACKGROUND OF THE INVENTION

The high level architecture (HLA) is a known software structure for generating a high level computer simulation from a group of lower level computer simulations. The HLA provides a structure having rules by which software developers can generate individual lower level software simulations so that they are reusable and can be used by a variety of higher level simulations.

Many complex higher level simulations simulate an overall system having system portions, which can be provided as simulations to other higher level simulations. For example, many higher level simulations require lower level simulations of human interactions, simulations of displays such as graphical user interfaces, and simulations of specific physical hardware. It is be useful to provide such lower level simulations in a reusable form, so that they can be used by a variety of higher level simulations.

Prior to development of the HLA, it was often necessary to extensively modify the lower level simulations to adapt them for use in each of the higher level simulations. For some higher level simulations, it was necessary to generate entirely new lower level simulations.

Reusability of lower level simulations is but one desirable characteristic provided by the HLA. Reusability, as described above, means that a particular lower level simulation can be reused by a variety of higher level simulations. Interoperability is another desirable characteristic provided by the HLA. Interoperability provides an ability for the lower level simulations to be distributed among a variety of physical computing platforms, which can also be of different types. Therefore, the individual lower level simulations that are combined in a higher level simulation can be distributed among a variety of computing platforms coupled together with a network.

As but one example, consider a situation in which a new weapons system is developed for use on an aircraft, and the new weapons system is simulated in a new weapons system computer simulation. Rather than generate, for example, a new aircraft computer simulation in which to use the new weapons system computer simulation, it would be desirable to provide reusability, which would allow use of an existing aircraft computer simulation. Furthermore, it would be desirable to provide interoperability, which would allow the new aircraft computer simulation to run on a first computer platform and the new weapons system computer simulation to run on a second computer platform. The HLA was developed to provide reusability and interoperability.

HLA simulations, also referred to herein as "HLA federation executions," are composed of lower level simulations call "federates" which combine into a high level simulation called a "federation." A federate can exist with multiple instances in a federation. For example, there can be several instances of a simulation of a particular weapons system, each a federate to a high level aircraft simulation, which can be the federation. Federates can also include system functions such as interfaces to human operators, interfaces to real hardware, and interfaces to general software functions such as data collection, data analysis, and data display. Federates can subscribe to and resign from a federation either statically or dynamically as the higher level simulation executes.

The HLA includes three primary components, HLA rules, HLA interface specifications, and an HLA object model template (OMTs). The HLA rules include both federation rules and federate rules. The federation rules include a requirement for a federation object model (FOM) in compliance with the OMT, and documentation thereof. The federation rules also establish a run-time infrastructure (RTI) in compliance with the HLA interface specifications. The federate rules include a requirement for a federate simulation object model (SOM) in compliance with the OMT, and documentation thereof. The federate rules make use of the RTI and specify a format for data exchange with other members of a federation by way of the RTI. The HLA interface specification identifies how federates interact with the federation and with each other.

The RTI provides software services to support HLA-compliant simulations. Different embodiments of the RTI software are possible. One exemplary version of RTI software was provided by the Defense Modeling and Simulation Office (DMSO) of the Department of Defense (DOD) as RTI-NG 1.3.

The HLA object model template (OMT) mentioned above requires a variety of elements within object software, including but not limited to, an object class structure table, an object interaction table, an attribute/parameter table, and an FOM/SOM lexicon. Essentially, the OMT requires external visibility of all characteristics required by external software in order to interface to a federation object or a federate object.

As a federation executes, in general, only the simulation outputs from the federation are known to a user. Intermediate transactions and results between federates are not generally visible to the user. This generally makes the HLA federation execution difficult to debug if an error occurs. It can also make federation execution difficult to interpret if results are unexpected.

SUMMARY OF THE INVENTION

The present invention provides a system and a method by which a user can view data associated with federates in a high level architecture (HLA) federation execution. With this particular arrangement, the system and method of the present invention allow a user to dynamically select information associated with the HLA federation execution to view as the HLA federation executes.

In accordance with the present invention, a method of providing a display associated with a high level architecture (HLA) federation execution includes generating an HLA federate, joining the HLA federate to the federation, and subscribing, using the HLA federate, to receive HLA-federationexecution data including at least one of object classes, object instances, object class attributes, object attribute values, interaction classes, interaction class parameters, interaction parameter values, and interaction occurrence data sets. The method further includes receiving the HLA-federation-execution data while the HLA federation executes. Still further, the method includes generating a display element, selecting a first one of an object instance, an object class attribute, an interaction class, and an interaction class parameter from among the HLA-federation-execution data while the HLA executes, and displaying a first at least one of an object attribute value, an interaction parameter value, and an interaction occurrence data set from among the HLA-federation-execution data with the display element in response to the selecting the first one, while the HLA executes. The method further includes selecting a second one of an object instance, an object class attribute, an interaction class, and an interaction class parameter from among the HLA-federation-execution data while the HLA federation executes, and displaying a second at least one of an object attribute value, an interaction parameter value, and an interaction occurrence data set from among the HLA-federation-execution data with the display element in response to the selecting the second one while the HLA federation executes.

In accordance with another aspect of the present invention, a system to provide a display associated with a high level architecture (HLA) federation execution includes a web interaction federate adapted to join the federation, subscribe to the federation, and to receive HLA-federation-execution data including at least one of object classes, object instances, object class attributes, object attribute values, interaction classes, interaction class parameters, interaction parameter values, and interaction occurrence data sets while the HLA federation executes. The system further includes a web client application adapted to dynamically display at least a portion of the HLA-federation-execution data while the HLA federation executes. The system still further includes a server coupled between the web interaction federate and the web client application, wherein the server is adapted to provide the HLA-federation-execution data to the web client application.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
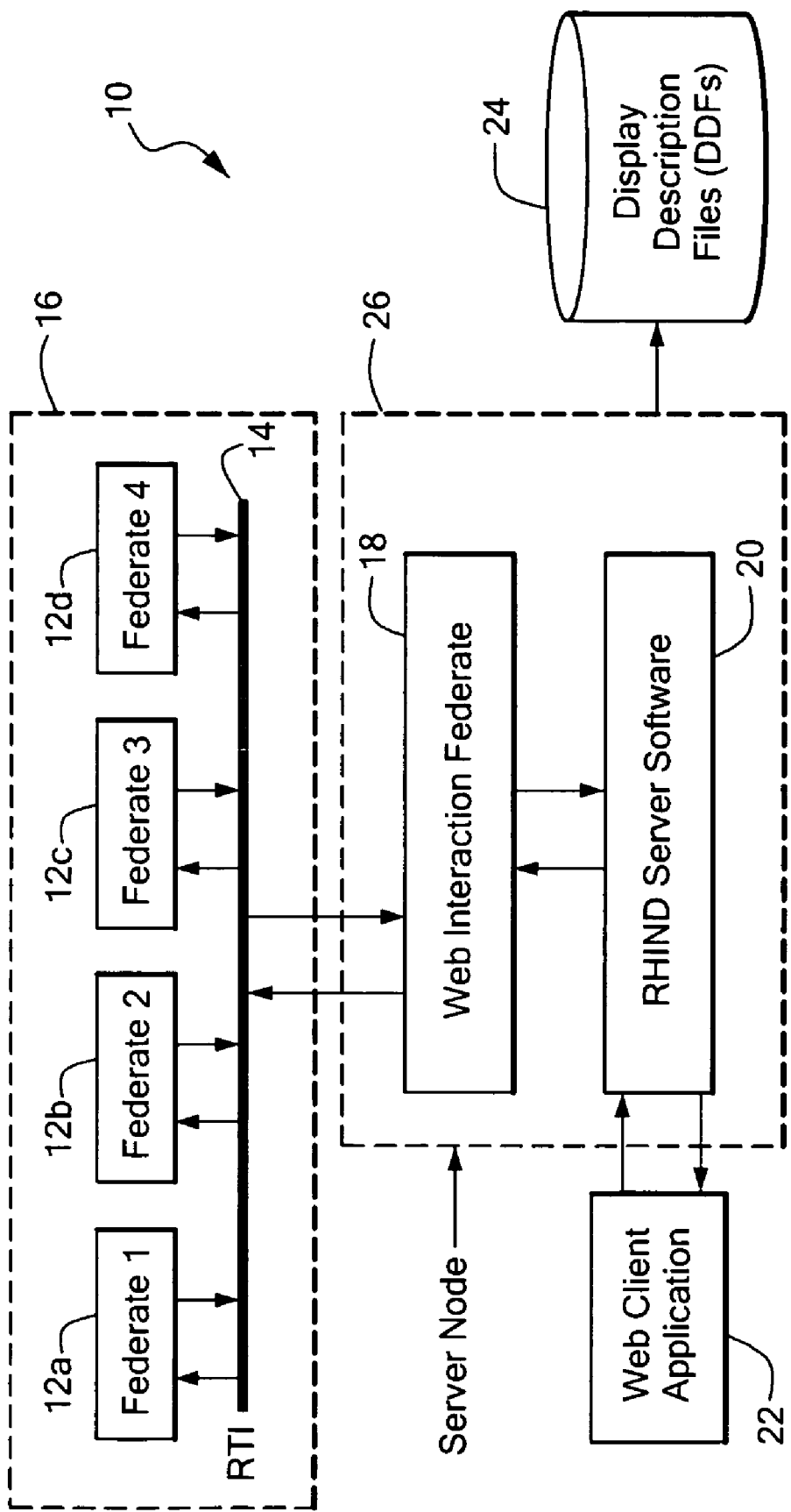
FIG. 1 is a block diagram representing software modules in accordance with a system for dynamic runtime HLA-federation-execution data display.

Before describing the system and method for dynamic runtime HLA-federation-execution data display, some introductory concepts and terminology are explained. The high level architecture (HLA) is a known software structure for generating a high level computer simulation, or federation execution, from a group of lower level computer simulations, or federates. The HLA includes three components, HLA rules, HLA interface specifications, and an HLA object model template (OMTs). The HLA rules include both federation rules and federate rules. The federation rules include a requirement for a federation object model (FOM) in compliance with the OMT, and documentation thereof.

The federation rules also establish a run-time infrastructure (RTI) in compliance with the HLA interface specifications. The RTI includes software having an executive portion that runs globally, and client portions associated with each federate.

The federate rules include a requirement for a federate simulation object model (SOM) in compliance with the OMT, and documentation thereof. The federate rules make use of the RTI and specify data exchange with other members of the federation by way of the RTI. The HLA interface specification identifies how federates interact with the federation and with each other.

As is known, a federation can include a hierarchy of "object classes," "object instances" associated with the object classes, "object class attributes" associated with the object classes, "object instances, and "object attribute values" associated with the object class attributes. When running, the federation generates the object attribute values (i.e., data). For example, an object class can be "aircraft," object instances thereof can be "Boeing 747," "Boeing 707," etc., an object class attribute can be "altitude," and an object attribute value can be "1000 feet."

This relationship can be shown as a hierarchy along with the above example as indicated below. Asterisks identify elements described below that can be dynamically changed in conjunction with a display.

|  | Example |
| --- | --- |
| object class | aircraft |
| *object instance | 747 |
| *object class attribute | altitude |
| object attribute value | 1000 feet |

As is also known, a federation can also include a hierarchy of "interaction classes," "interaction class parameters" associated with the object classes, and "interaction parameter values" associated with the interaction class parameters. When running, the federation generates the interaction parameter values. For example, an interaction class can be "munitions detonation," an interaction class parameter can be "radius," and an interaction parameter value can be "seven meters."

This relationship can be shown as a hierarchy along with the above example as indicated below. Asterisks identify elements described below that can be dynamically changed in conjunction with a display.

|  | Example |
| --- | --- |
| *interaction class | munitions detonation |
| *interaction class parameter | radius |
| interaction parameter value | 7 meters |

As used herein the object classes, object instances, object class attributes, object attribute values, interaction classes, interaction class parameters, interaction parameter values, and interaction occurrence data sets (described more fully below) are referred to as "HLA-federation-execution data."

The hierarchies associated with the object classes and interaction classes are generally laid out in an object model template (OMT) file. The OMT file includes all object classes for which object instances can be created during HLA federation execution and all interaction classes for which interactions may occur during the HLA federation execution. A federation execution details (FED) file is known to be similar to the OMT file, but without the listing of object class attributes and interaction class parameters. A runtime infrastructure details (RID) file is known to include information specifying a network address of the RTI executive software portion.

Therefore, as used herein, the term "object class attribute" is used to describe a characteristic of data associated with an object class. For example, an object class attribute associated with the object class "airplane" in the above example can be altitude. As used herein, the term "object attribute value" is used to describe actual numerical data associated with an object class attribute. For example, the object attribute value in the above example can be 1000 in units of feet. Furthermore, a "data type" as used herein describes a data format, for example, floating point.

As used herein, the term "interaction class parameter" is used to describe a characteristic of data associated with an interaction class. For example, an interaction class parameter associated with the interaction class "munitions detonation" in the above example can be radius.

As used herein, the term "interaction parameter value" is used to describe actual numerical data associated with an interaction class parameter. For example, the interaction parameter value in the above example can be seven in units of meters.

While the invention is described herein in terms of a particular HLA defined by the Defense Modeling and Simulation Office (DMSO) of the Department of Defense (DOD) and a run-time interface (RTI) also according to the DMSO, it should be recognized that the same principles apply to any HLA operating as a distributed system having lower level simulations (i.e., federates) combined into a higher level simulation (i.e., in a federation).

Referring to FIG. 1, an exemplary system 10 includes federates 12a-12d coupled together with a runtime infrastructure (RTI), forming a federation 16. In some embodiments, the RTI is associated with a physical layer 14 described more fully below. However, it should be understood that that the RTI comprises software, having an executive portion running on a server (not shown) and client portions running in each of the federates 12a-12d, allowing the federates 12a-12d to communicate with each other within a federation 16.

The federates 12a-12d provide an HLA federation execution, which can execute on separate servers or on the same server or in any combination of servers. Therefore, in some embodiments, the federates 12a-12d can be distributed, executing on separate computing platforms. However, in other embodiments, any combination of the federates 12a-12d can be collocated to run on a single computing platform.

It will be understood that in some embodiments, in which the federates 12a-12d all operate together in a single server, there may be no physical layer 14. However, in these embodiments, RTI software still controls communication between the federates 12a-12d.

In other embodiments, the federates 12a-12d are distributed and interconnected with the digital network 14, for example an Ethernet network or a wide-area network (WAN). The digital network 14 provides the physical layer with which the federates 12a-12d can communicate via RTI software.

The federates 12a-12d in combination with the RTI form the federation 16, which, when running, provides the HLA federation execution. While four federates 12a-12d are shown, it should be appreciated that, in other embodiments, more than four or fewer than four external federates can be used.

A web interaction federate (WIF) 18 is coupled to the federation 16. A RHIND (runtime HLA interactive network display) server having RHIND server software 20 is coupled to the web interaction federate 18. The RHIND server software 20 provides instructions for an interface between the web interaction federate 18 and a web client having a web client application 22, and also provides instructions for an interface between the web client application 22 and a display description files (DDF) database 24.

The WIF 18 functions are more fully described below in conjunction with FIGS. 3B, 5B, 7B, and 9B. Let it suffice here to say that the WIF 18 can join and subscribe to the federation 16 and can receive HLA-federation-execution data from the federation 16.

The web client application 22 is more fully described below in conjunction with FIGS. 3, 5, 7, and 9 and also in conjunction with FIGS. 4-4E, 6-6D, 8-8D, and 10-10D. The web client application 22 provides a graphical user interface (FIGS. 4-4E, 6-6D, 8-8D, and 10-10D) with which a user can build and save display formats having display elements. The user can also dynamically select (while the HLA federation executes in the federation 16) at least one of object instances, object class attributes, interaction classes, and interaction class parameters resulting in a display of respective object attribute values and respective interaction parameter values or a respective interaction occurrence data set. The user can further dynamically select (while a HLA federation executes in the federation 16) another at least one of the object instances, object class attributes, interaction classes, and interaction class parameters resulting in a display of other respective object attribute values and respective interaction parameter values or other respective interaction occurrence data sets.

The RHIND server software 20 functions are more fully described below in conjunction with FIGS. 3A, 5A, 7A, and 9A. Let it suffice here to say that the RHIND server software 20 receives instructions from the web client application 22 and operates according to the instructions. For example, a user of the web client application 22 can build a display format having display elements and can instruct the RHIND server software 20 to store the display format to the DDF database 24. For another example, a user of the web client application 22 can dynamically request one or more of an object instance, an object class attribute, an interaction class, and an interaction class parameter associated with the federation 16 and the RHIND server software 20 can forward the request to the WIF 18, resulting in respective data being sent by the WIF 18 to the RHIND server software 20 and to the web client application 22 for display.

The DDF database 24 is adapted to store display characteristics of one or more displays generated by a user via the web client application 22 as display description field (DDFs). The display characteristics can include, but are not limited to, display elements. The DDF elements can include, but are not limited to, dial gauges, bar gauges, line charts, pie charts, spreadsheet cells, and text boxes. A DDF having the stored display characteristics can later be retrieved so that the user can view or modify a display having the stored display characteristics. Functions of the DDFs will become more apparent in conjunction with FIGS. 4-4E, 6-6D, 8-8D, and 10-10D below.

The WIF 18, the RHIND server software 20, and the web client application 22 can be separate, running on separate computing platforms. However, in other embodiments, any combination of the WIF 18, the RHIND server software 20, and the web client application 22 can be integrated to run on one computing platform.

Upon user selection of an object instance, described more fully below, the WIF 18 is able to filter the object attribute values to provide only an object attribute value associated with the selected object instance. The selection can be dynamic, allowing a user to select different object instances for which to view object attribute values as the HLA federation executes. The object instance and associated object attribute value associated with a display element can be updated dynamically at any time while the HLA federation executes.

Upon user selection of an object class attribute, described more fully below, the WIF 18 is also able to provide only an object attribute value associated with the selected object class attribute. The selection can be dynamic, allowing a user to select different object class attributes for which to view associated object attribute values as the HLA federation executes.

The object class attribute and associated object attribute value associated with a display element can be updated dynamically at any time while the HLA federation executes.

Upon user selection of an interaction class, described more fully below, the WIF 18 is also able to provide an interaction occurrence data set associated with the selected interaction class. The selection can be dynamic, allowing a user to select different interaction classes for which to view associated interaction occurrence data sets as the HLA federation executes. The interaction class and associated interaction occurrence data set associated with a display element can be updated dynamically at any time while the HLA federation executes.

Upon user selection of an interaction class parameter, described more fully below, the WIF 18 is also able to provide an interaction parameter value associated with the selected interaction class parameter. The selection can be dynamic, allowing a user to select different interaction class parameters for which to view associated interaction parameter values as the HLA federation executes. The interaction class parameter and associated interaction parameter value associated with a display element can be updated dynamically at any time while the HLA federation executes.

It should be appreciated that FIGS. 2, 3-3B, 5-5B, 7-7B, and 9-9B show flowcharts corresponding to the below contemplated technique which would be implemented in computer system 10 (FIG. 1). The rectangular elements (typified by element 202 in FIG. 2), herein denoted "processing blocks," represent computer software instructions or groups of instructions.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the blocks can be performed in any convenient or desirable order.

Figure 2:
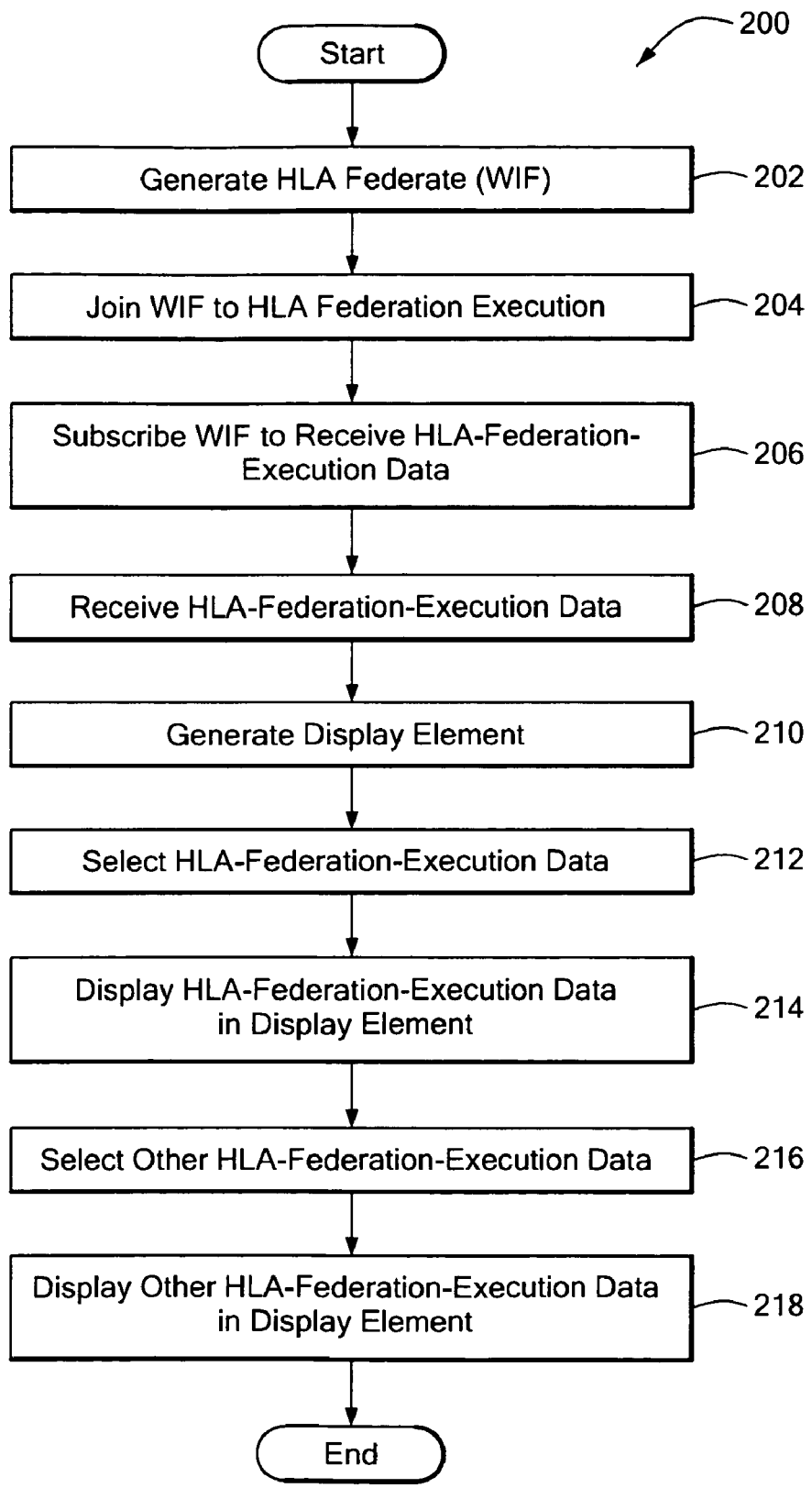
FIG. 2 is a flow chart showing an exemplary process used by the system of FIG. 1.

Referring now to FIG. 2, a process 200 begins at block 202, where a HLA federate is generated, for example, in accordance with the web interaction federate (WIF) 18 shown in FIG. 1. The WIF 18 is adapted to operate with many functions similar to the federates 12a-12d of FIG. 1. At block 204, the WIF 18 joins a federation, for example, the federation 16 of FIG. 1, and at block 206, the WIF 18 subscribes to HLA-federation-execution data 16. The terms "join" and "subscribe" will be recognized by those familiar with HLA architectures.

The subscribing at block 206 allows the WIF 18 to receive HLA-federation-execution data from the federation 16 at block 208. For example, the WIF 18 can receive object instances and associated object attribute values. For another example, the WIF 18 can receive an indication that an interaction has occurred, and an "interaction occurrence data set," including but not limited to, a time that the interaction occurred, an associated interaction class, an associated interaction class parameter, and an associated interaction parameter value.

At block 210, at least one display element is generated, for example, by a user in conjunction with the web client application 22 of FIG. 1. The at least one display element can be associated with a display format that can be saved and recalled to and from the DDF database 24 of FIG. 1.

At block 212, HLA-federation-execution data is selected, for example, by a user of the web client application 22 of FIG. 1. In one particular embodiment, the selection of HLA-federation-execution data can be made in accordance with a selection of an object instance, an object class attribute, an interaction class, and/or an interaction class parameter. The selection is described more fully below. The selection can be dynamic, meaning that the selection can be made while the HLA federation executes.

At block 214, HLA-federation-execution data associated with that selected at block 212 is displayed in the display element generated at block 210. The displayed HLA-federation-execution data can be a portion of the HLA-federation-execution data received at block 208. For example, if a particular object instance or a particular object class attribute is selected at block 212, at block 214, an associated object attribute value can be displayed block 214. For another example, if a particular interaction class is selected at block 212, an interaction occurrence data set (described above), can be displayed at block 214. For yet another example, if a particular interaction class parameter is selected at block 212, an associated interaction parameter value can be displayed at block 214. The selections and displays will be further understood from discussion below.

At block 216, other HLA-federation-execution data is selected, for example, by a user of the web client application 22 of FIG. 1. In one particular embodiment, the selection of the other HLA-federation-execution data can be made in accordance with a selection of another object instance, another object class attribute, another interaction class, and/or another interaction class parameter. The selection can be dynamic, meaning that the selection can be made while the HLA federation executes.

At block 218, HLA-federation-execution data associated with that selected at block 216 is displayed in the display element generated at block 210. The displayed HLA-federation-execution data can be another portion of the HLA-federation-execution data received at block 208. For example, if another particular object instance or a another particular object class attribute is selected at block 212, at block 214, another associated object attribute value can be displayed block 214. For another example, if another particular interaction class is selected at block 212, another interaction occurrence data set (described more fully below), can be displayed at block 214. For yet another example, if another particular interaction class parameter is selected at block 212, another associated interaction parameter value can be displayed at block 214.

With the above arrangement, the display element generated at block 210 can provide a display of HLA-federation-execution data. The displayed HLA-federation-execution data can be dynamically selected, or changed, while the HLA federation executes.

It will be appreciated that some of the steps 202-210 can be repeated in order to provide the selection and display of other HLA simulation data at blocks 216-218. For example, the subscribing of block 206 can be repeated any number of times. This will become apparent from discussion below.

Figure 3:
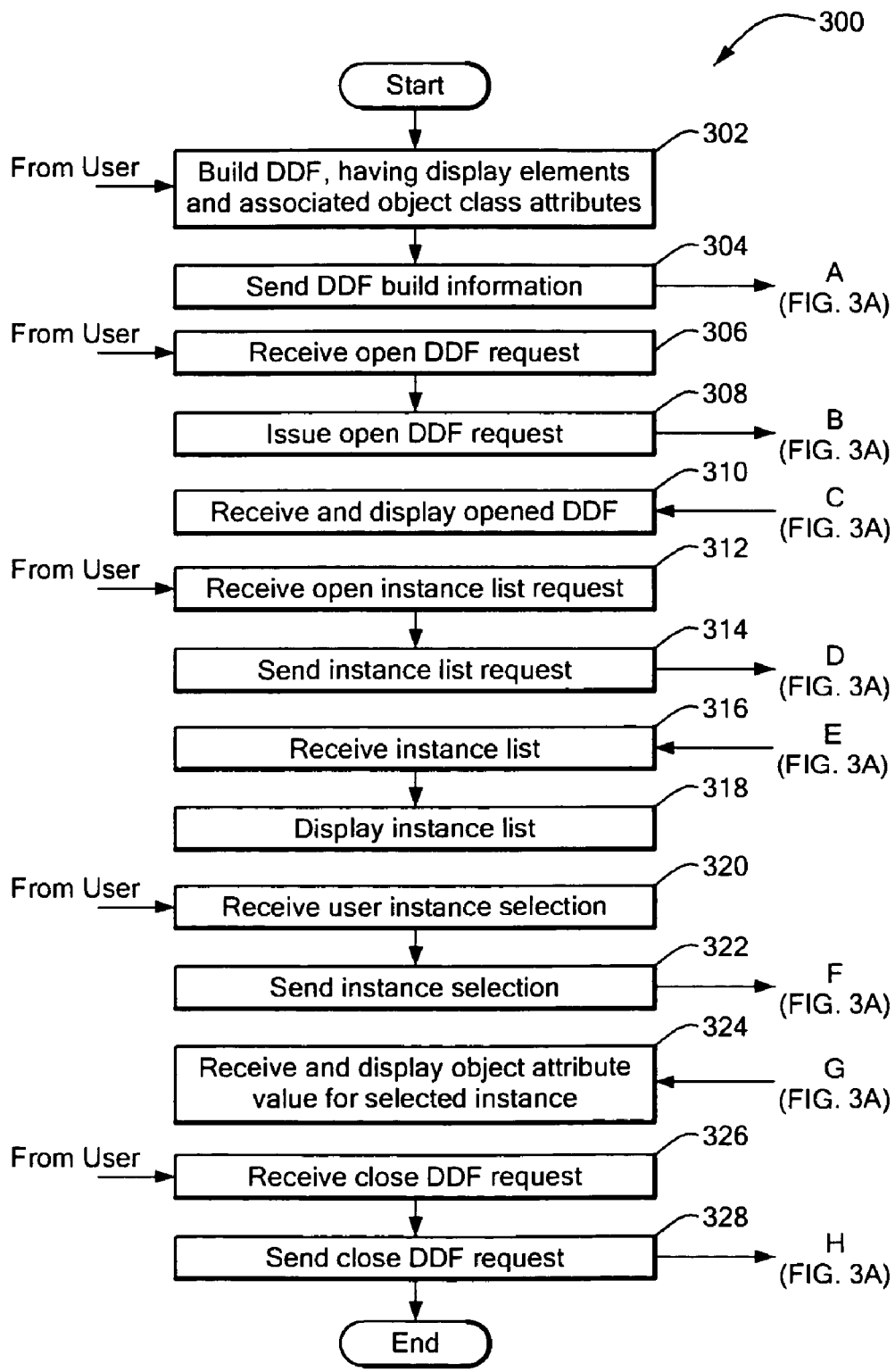
FIG. 3 is a flow chart showing an exemplary process for providing a web client application associated with selection of an object instance, which is used by the system of FIG. 1.
Figure 3A:
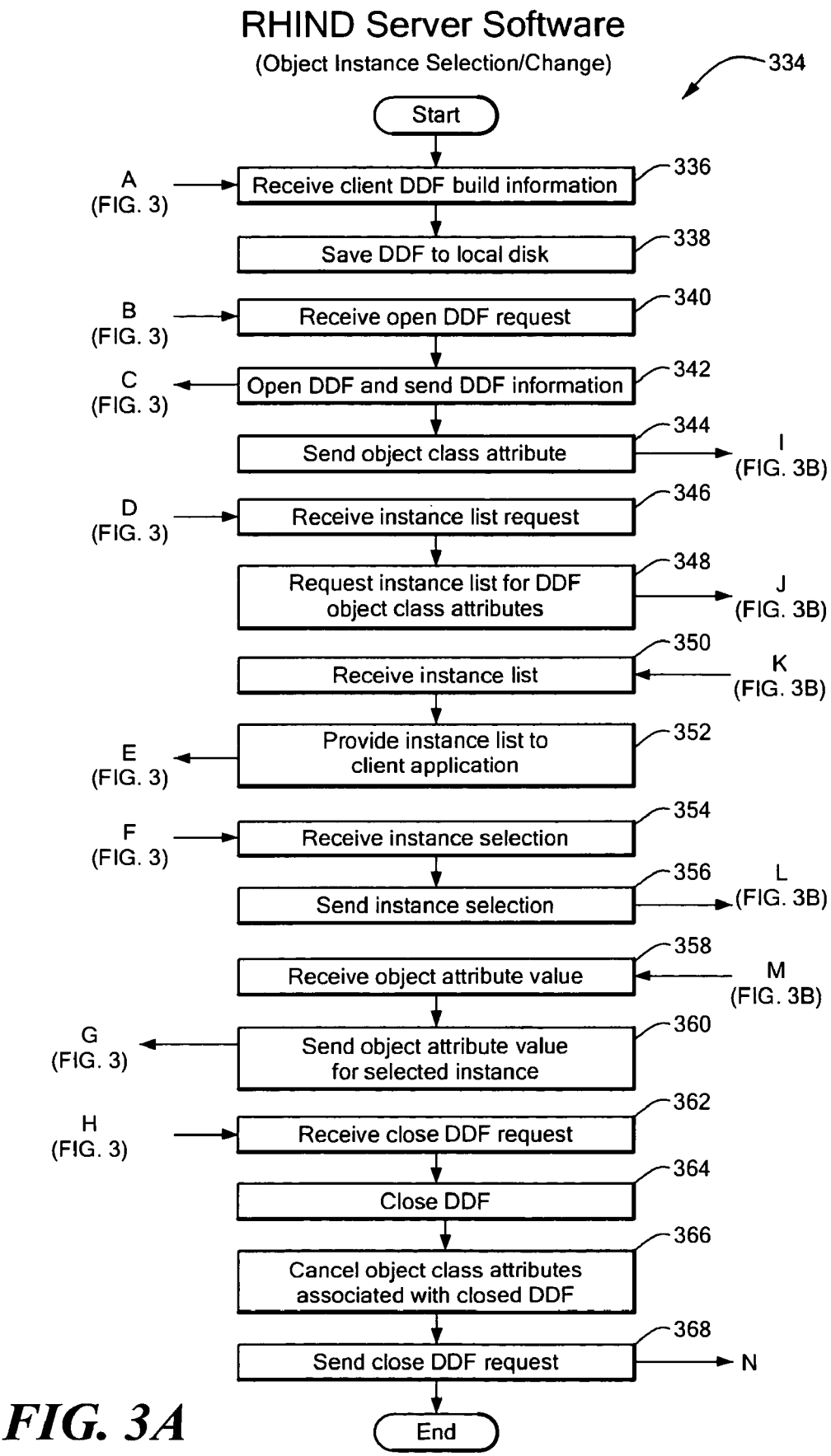
FIG. 3A is a flow chart showing an exemplary process for providing RHIND (runtime HLA interactive network display) server software associated with selection of an object instance, which is used by the system of FIG. 1.
Figure 3B:
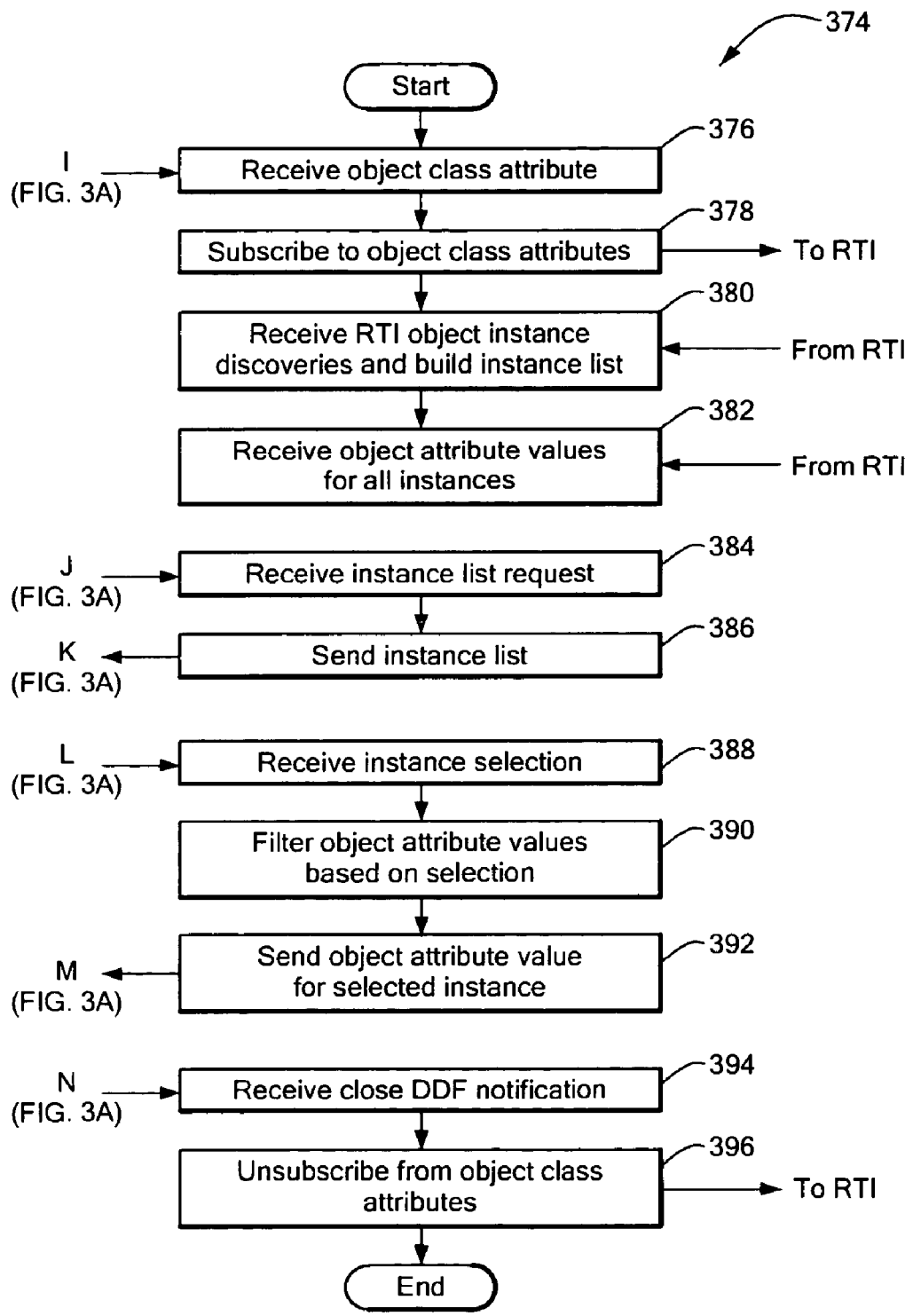
FIG. 3B is a flow chart showing an exemplary process for providing a web interaction federate associated with selection of an object instance, which is used by the system of FIG. 1.

Referring now to FIG. 3, letter reference designators A-H have corresponding letter reference designators A-H on FIG. 3A, to which they couple. FIGS. 3, 3A, and 3B can be taken together to show the interactions between a web client application (FIG. 3), RHIND server software (FIG. 3A), and a web interaction federate (WIF) (FIG. 3B). However, the figures are discussed separately below.

A process 300 is associated with a web client application, for example the web client application 22 of FIG. 1. The process receives user inputs, labeled "From User," which are associated with graphical user interfaces (not shown). The graphical user interfaces are described below in conjunction with FIGS. 4-4E.

At block 302, a user can build a display description file (DDF). The DDF can include, for example, display elements and associated object class attributes. The DDF is sent as DDF build information at block 304 to RHIND server software, for example the RHIND server software 20 of FIG. 1, which is represented as a flow chart in FIG. 3A.

A user can provide a request to open a saved DDF, which is received at block 306. A corresponding open DDF request is issued at block 308, which can be passed to the RHIND server software, for example, the RHIND server software of FIG. 3A. The opened DDF provides a graphical user interface (e.g., FIG. 4).

At block 310, the web client application can receive and display an opened DDF in response to the request provided at block 308. The opened DDF can be provided, for example, by the RHIND server software of FIG. 3A. The opened DDF provides a graphical user interface (e.g., FIG. 4).

The user can provide a request to open an object instance list, which is received at block 312. The receipt of the request to open an object instance list at block 312 results, at block 314, in an issuance of an instance list request to the RHIND server software of FIG. 3A. At block 316, an object instance list is received from the RHIND server software of FIG. 3A. At block 318, the object instance list received at block 316 can be displayed, for example as a menu on a graphical user interface (e.g., FIGS. 4A, 4C).

The user can select an object instance associated with the object instance list displayed at block 318, and the selection is received at block 320. At block 322, in response to the instance selection received at block 320, the web client application sends the object instance selection to the RHIND server software of FIG. 3A.

At block 324, in response to the object instance selection sent at block 322, an associated object attribute value is received and displayed in conjunction with a display element in the DDF opened and displayed at block 310.

The user can select to close the DDF opened at block 310, and the selection is received at block 326. At block 328, in response to the close DDF request received at block 326, at block 328, a close DDF request is sent to the RHIND server software of FIG. 3A.

Referring now to FIG. 3A, a process 334 is associated with RHIND server software, for example, the RHIND server software 20 of FIG. 1. Letter reference designators A-H have corresponding letter reference designators A-H on FIG. 3, corresponding to the web client application to which they couple. Letter reference designators I-N have corresponding letter reference designators I-N on FIG. 3B, corresponding to a web interaction federate to which they couple.

At block 336, the RHIND server software receives the client DDF build information provided, for example, by the web client application of FIG. 3 (block 304), which can be saved at block 338 to a local hard drive or other storage medium. The local hard drive can correspond, for example to the DDF database 24 of FIG. 1.

At block 340, the RHIND server software receives a request to open a saved DDF, for example, by the web client application of FIG. 3 (block 308). At block 342, the requested DDF is opened and corresponding DDF information is sent, for example, to the web client application of FIG. 3 (block 310). At block 344, at least one object class attribute associated with the DDF opened at block 342 is sent, for example, to the web interaction federate of FIG. 3B.

At block 346, a request for an object instance list is received, for example, from the web client application of FIG. 3 (block 314). In response to the object instance list request received at block 346, the RHIND server software issues a request for the object instance list at block 348, for example, to the web interaction federate of FIG. 3B. In response, the object instance list is received at block 350 from the web interaction federate of FIG. 3B, which is then sent at block 352 to the web client application of FIG. 3 (block 316).

At block 354, the RHIND server software receives an object instance selection, for example from the web client application of FIG. 3 (block 322). The instance selection is sent at block 356 to the web interaction federate of FIG. 3B.

In response to the object instance selection sent at block 356, the web interaction federate of FIG. 3B returns an object attribute value associated with the selected object instance, which is received at block 358, which is then sent at block 360 to the web client application of FIG. 3 (block 324).

At block 362 the RHIND server software can receive a request to close the DDF opened at block 342. The request can be provided, for example, by the web client application of FIG. 3 (block 328). Upon receiving the request to close the open DDF, at block 364, the DDF is closed, at block 366, the object class attributes associated with the DDF are canceled, and at block 368 notification is sent that the DDF is closed to the web interaction federate of FIG. 3B.

Referring now to FIG. 3B, a process 374 is associated with a web interaction federate (WIF), for example, the web interaction federate 18 of FIG. 1. Letter reference I-N have corresponding letter reference designators I-N on FIG. 3A, corresponding to the RHIND server software to which they couple.

At block 376, an object class attribute is received, for example from the RHIND server software of FIG. 3A (block 344). In response to the receipt of the object class attribute, at block 378, the WIF joins and subscribes to a federation, for example, to the federation 16 of FIG. 1, via an RTI, for example the RTI of FIG. 1. In response to the subscribing of block 378, at block 380, the WIF receives from the federation (via the RTI) RTI object instance discoveries associated with an HLA federation execution. At block 382, the WIF also receives object attribute values associated with the object instances.

At block 384, the WIF receives a request for an instance list, for example from the RHIND server software of FIG. 3A (block 348). In response to the request, at block 386, the object instance list is sent to the RHIND server software of FIG. 3A (block 350).

At block 388, the WIF receives an instance selection, for example from the RHIND server software of FIG. 3A (block 356). At block 390, the object attribute values received at block 380 are filtered according to the object instance selection. For example, if a Boeing 747 object instance selection is received at block 388, and an object class attribute of altitude is received at block 376, then at block 392, an object attribute value, for example, 1000 feet, is returned at block 392.

At block 394, a notification is received that the DDF has been closed, for example, from the RHIND server software of FIG. 3A (block 368). In response to the notification, the process 374 unsubscribes from the object class attributes associated with the HLA federation execution.

In view of the processes 300, 334, and 374 of FIGS. 3, 3A, and 3B, respectively, it should be apparent that a user can initiate a change to an object attribute value associated with a display element, for example, by a selection of an object instance at block 320 of FIG. 3. The object instance, and therefore, the object attribute value, can be dynamically updated while the HLA federation executes.

Figure 4:
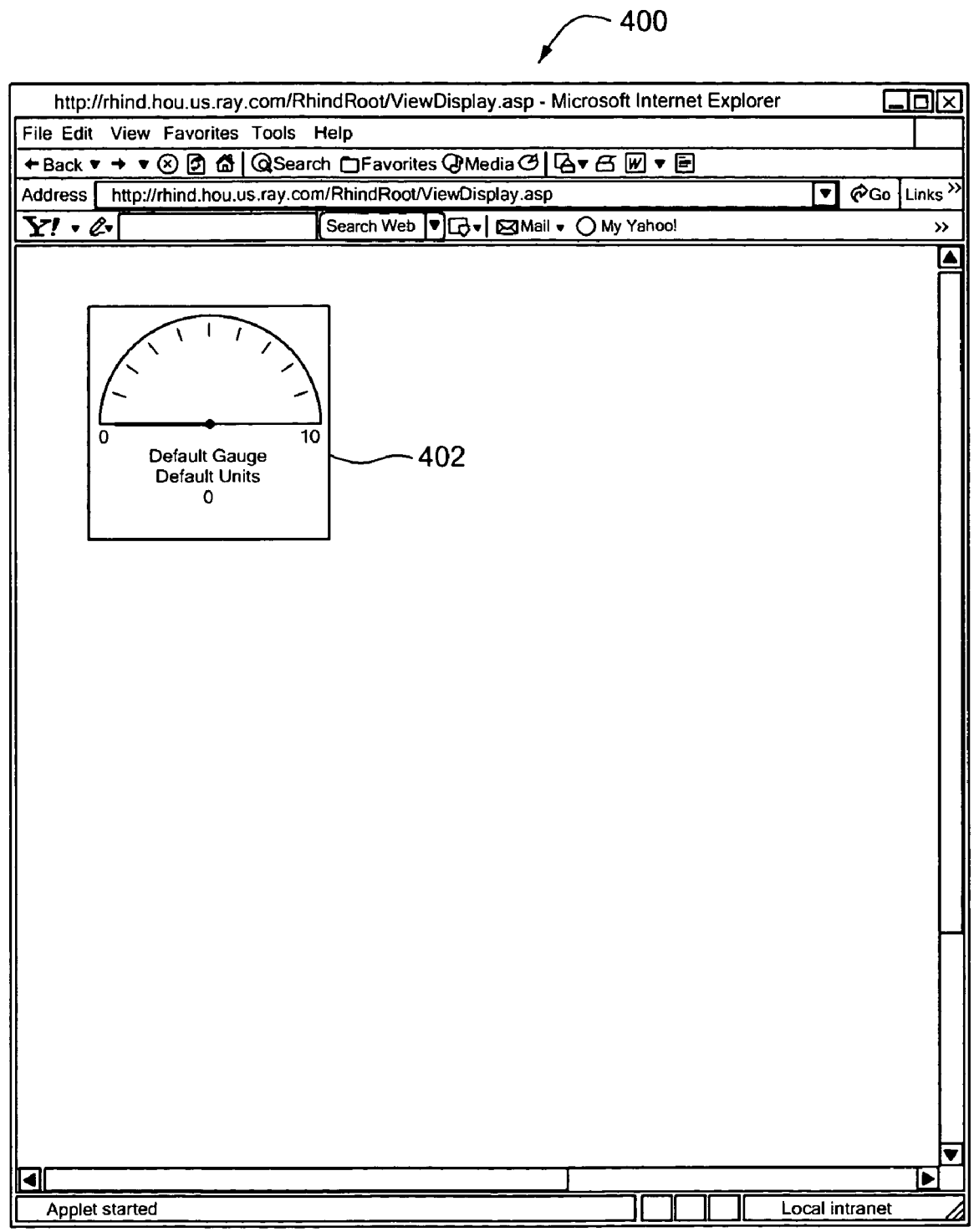
FIGS. 4-4E are pictorials showing exemplary graphical user interfaces associated with the processes of FIGS. 3-3B.
Figure 4A:
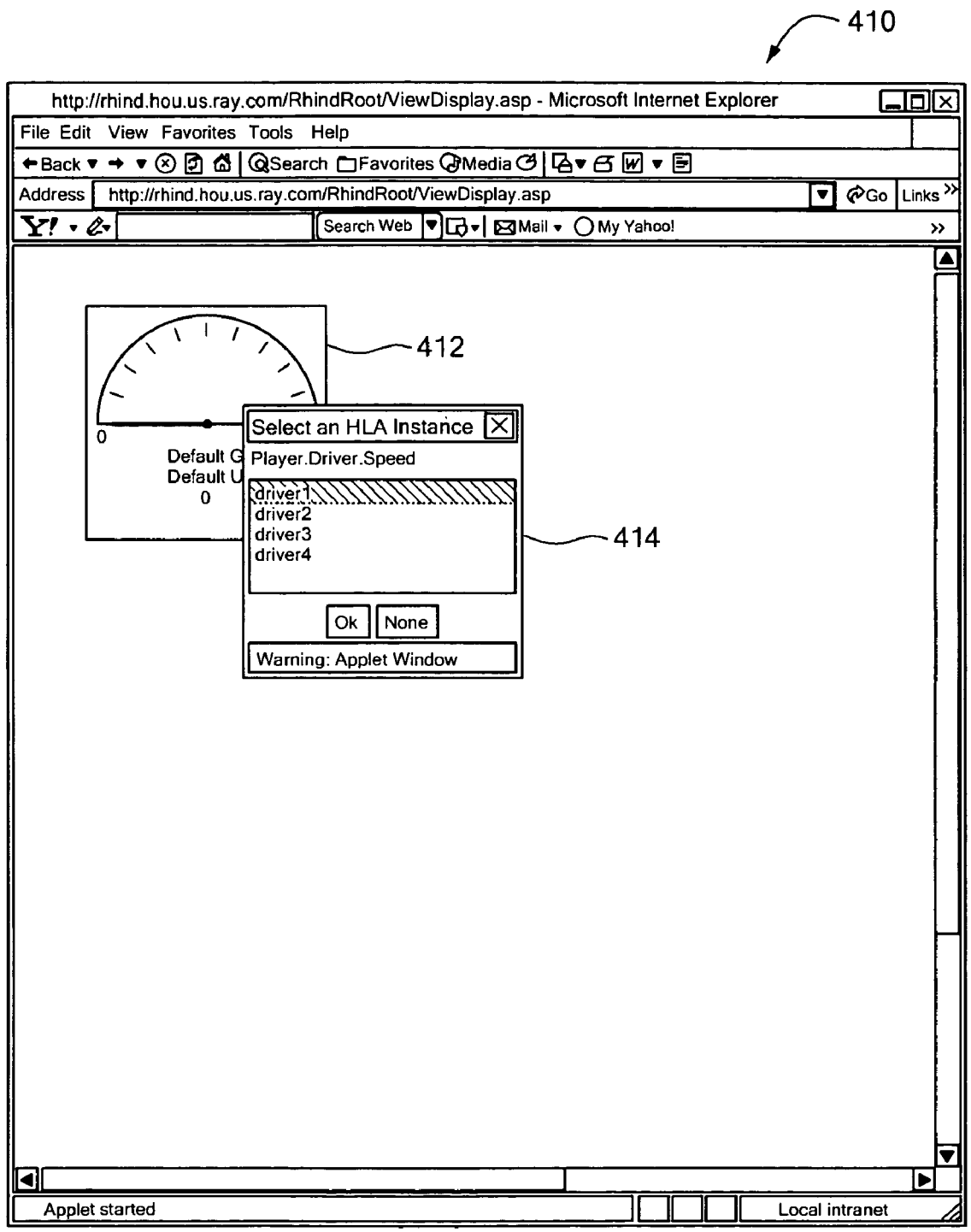
Figure 4B:
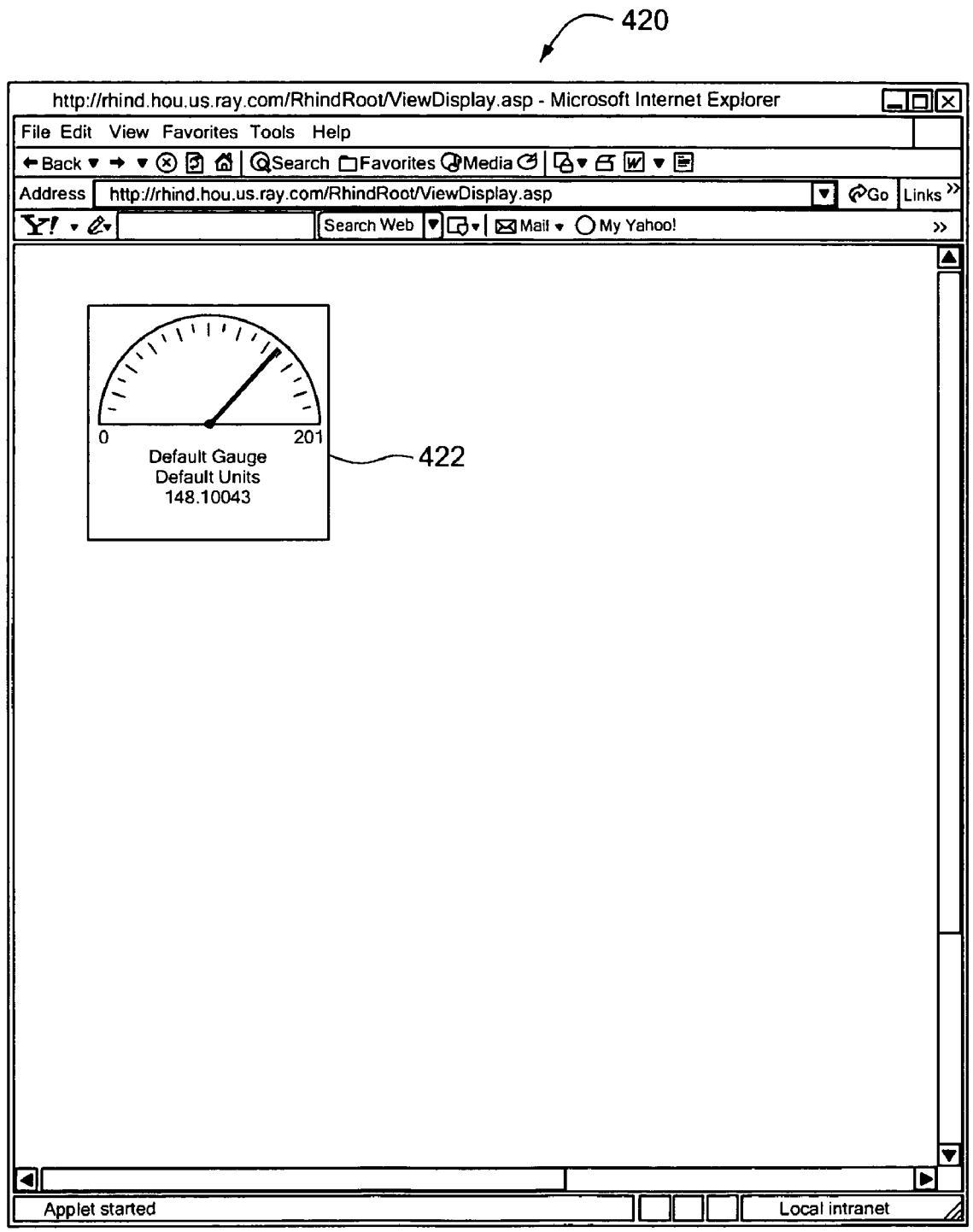
Figure 4C:
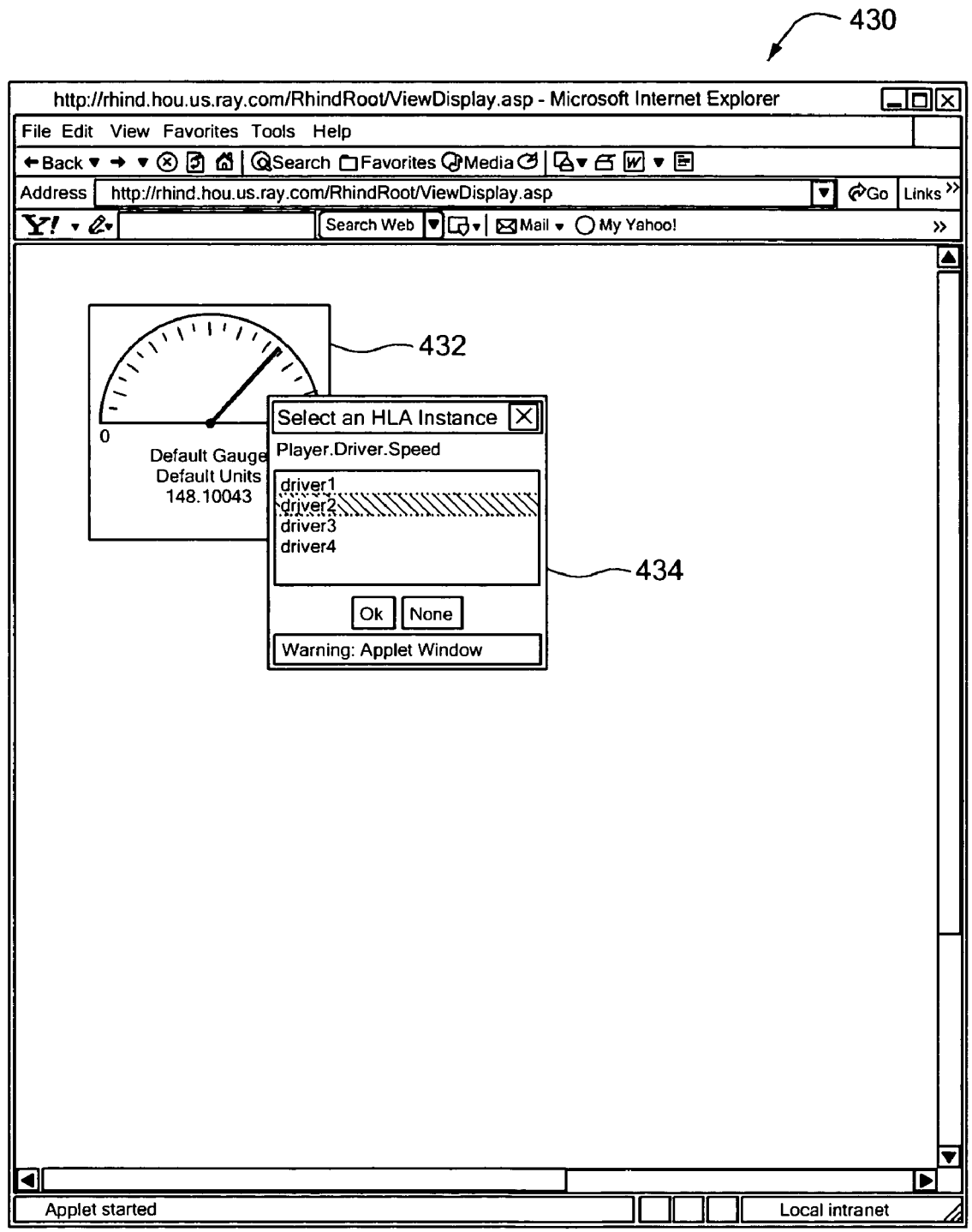
Figure 4D:
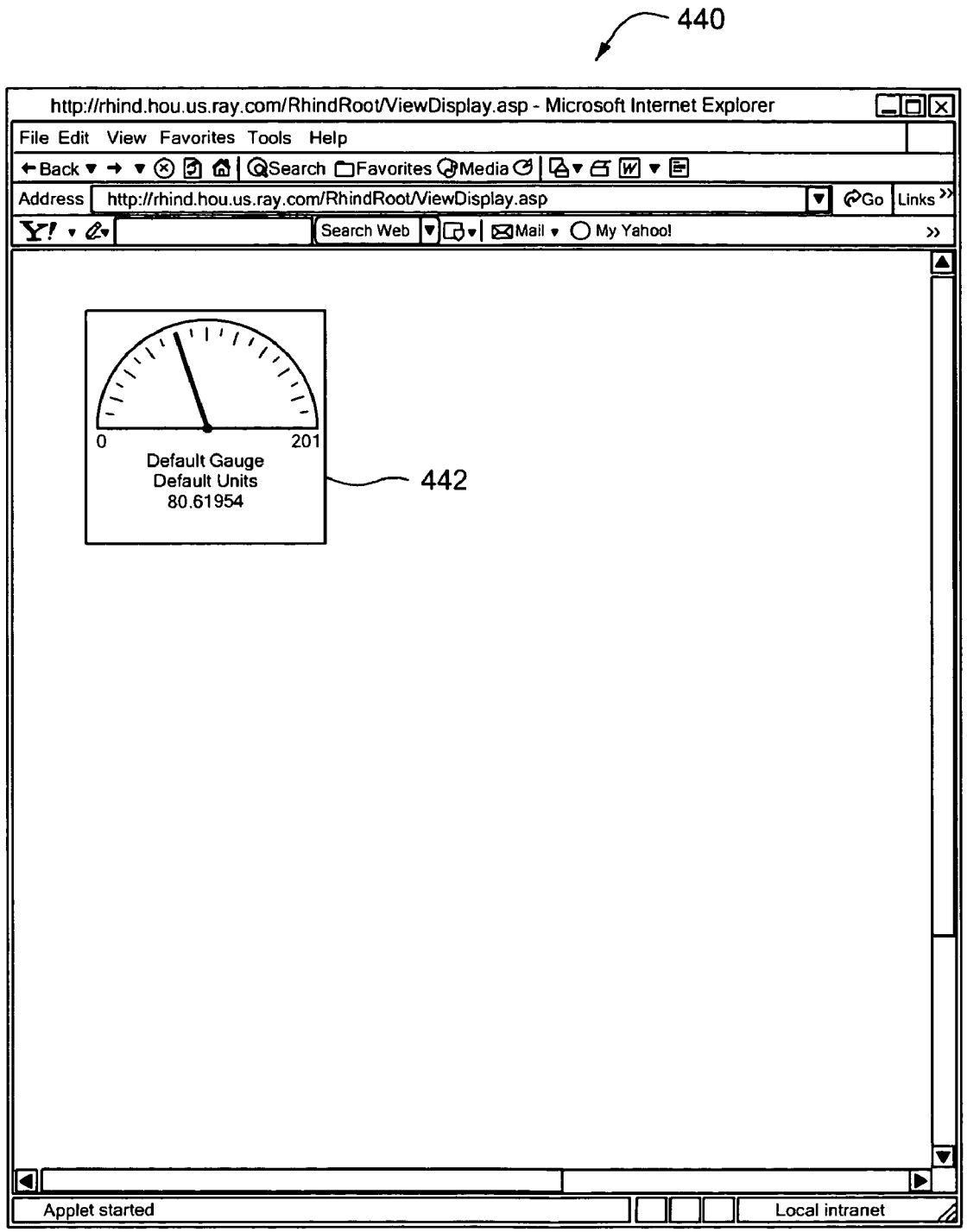
Figure 4E:
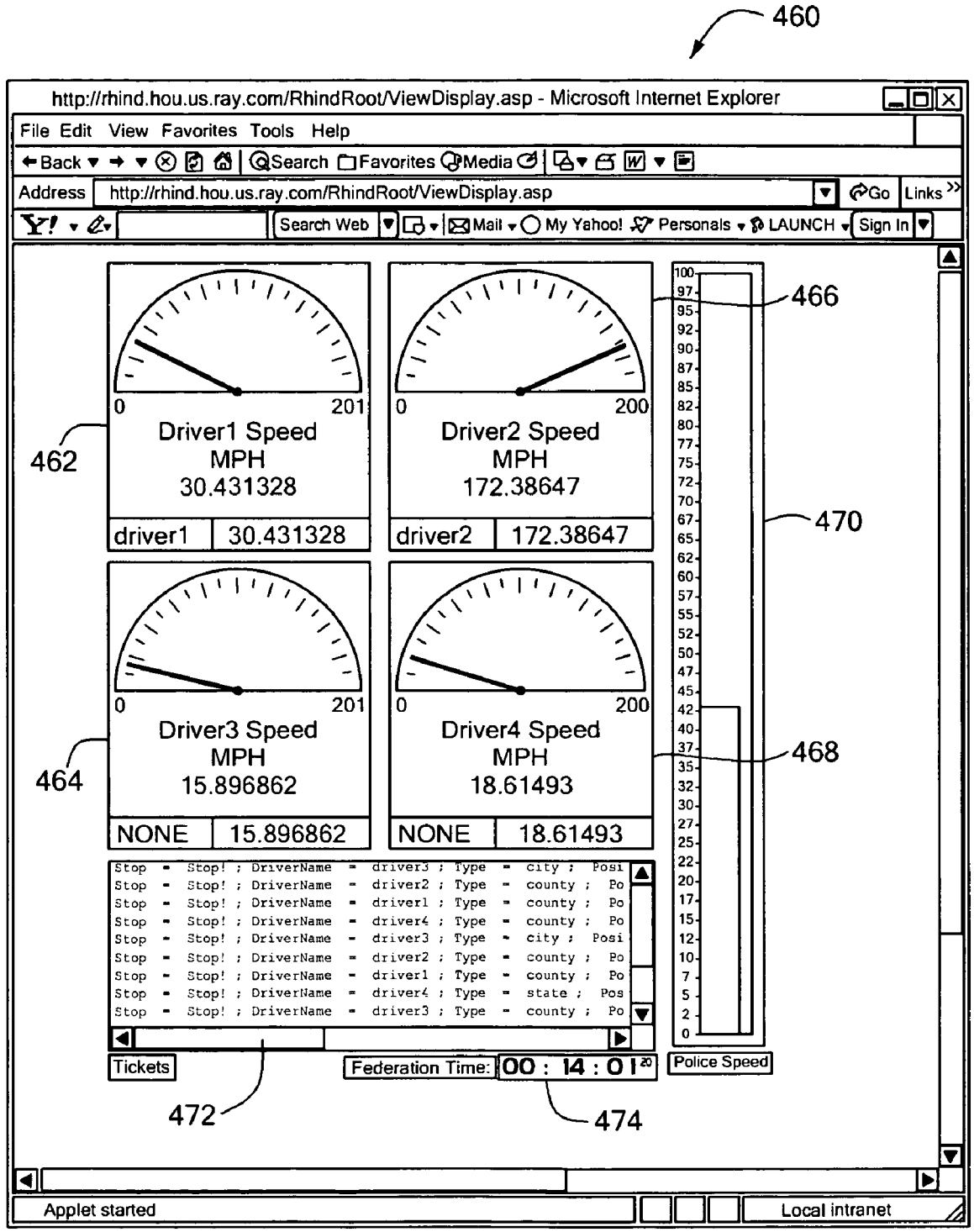

FIGS. 4-4E show graphical user interfaces according to the processes of FIGS. 3-3B. Referring first to FIG. 4, an exemplary graphical user interface 400 includes a display element 402, which is a dial gauge. The display element has no associated data, as would be provided, for example, at blocks 302 and 310 of FIG. 3.

Referring now to FIG. 4A, another exemplary graphical user interface 410 includes a display element 412, which is a dial gauge, and a menu 414. The menu provides a list of object instances as would be provided, for example, at block 318 of FIG. 3. In this example, the object instances are drivers of vehicles used in an HLA federation execution. The user can select an object instance, here driver 1, for example, at block 320 of FIG. 3.

Referring now to FIG. 4B, another exemplary graphical user interface 420 includes a display element 422, which is a dial gauge. The display element 422 now shows data corresponding to an object attribute value for the selected object instance (driver 1), selected in the menu 414 of FIG. 4A. In this example, the object attribute value corresponds to a speed of 148.10043 miles per hour.

The displayed object attribute value in the display element 422 corresponds to block 324 of FIG. 3. It should be recognized that the object attribute value (speed) is provided in the display element 422 while the HLA federation executes.

Referring now to FIG. 4C, another exemplary graphical user interface 430 includes a display element 432, which is a dial gauge, and a menu 434. The menu again provides the list of object instances (e.g., menu 414, FIG. 4A) as would be provided, for example, at block 318 of FIG. 3. In this example, the object instances are drivers of vehicles used in the HLA federation execution. The user can select an object instance, here driver 2, for example, at block 320 of FIG. 3.

Referring now to FIG. 4D, another exemplary graphical user interface 440 includes a display element 442, which is a dial gauge. The display element 442 now shows data corresponding to another object attribute value, for the object instance (driver 2) selected in the menu 434 of FIG. 4C. In this example, the object attribute value corresponds to a speed of 80.51954 miles per hour.

The displayed object attribute value in the display element 442 corresponds to block 324 of FIG. 3. It should be recognized that the object attribute value (speed) is again provided in the display element 442 while the HLA federation executes.

In the display elements 412, 422, 432, and 442 of FIGS. 4-4D, the text "Default Gauge" and "Default Units" can be replaced by a user with any desired text.

Referring now to FIG. 4E, a graphical user interface 460 includes four display elements 462, 464, 466, 468, which are dial gauges, a display element 472, which is a text box, and a display element 474, which indicates HLA federation execution time. While not shown, a user is able to dynamically update the displayed data in any of the display elements according to the processes of FIGS. 3-3B and according to the techniques described in conjunction with FIGS. 4-4D.

Figure 5:
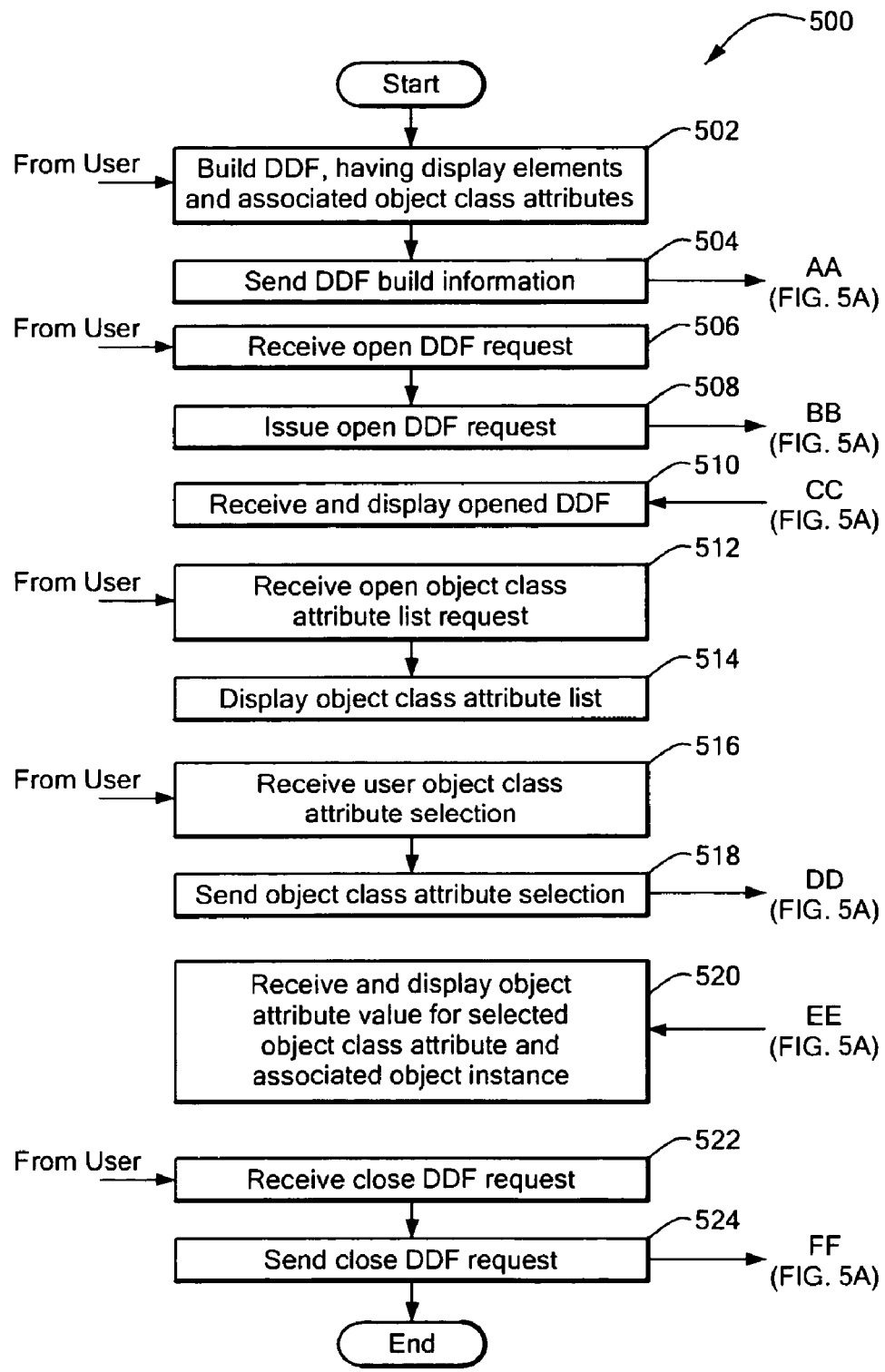
FIG. 5 is a flow chart showing an exemplary process for providing a web client application associated with selection of an object class attribute, which is used by the system of FIG. 1.
Figure 5A:
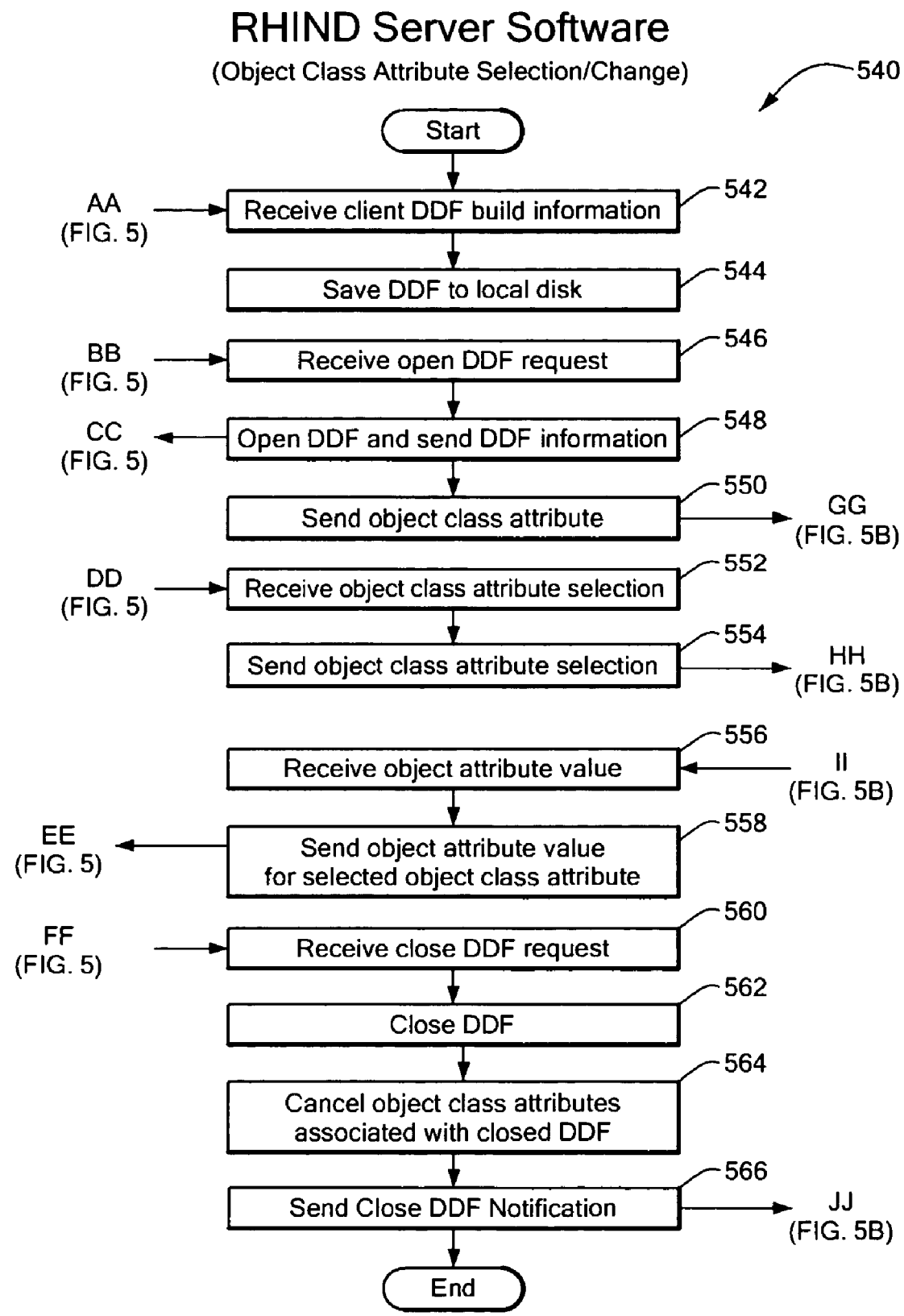
FIG. 5A is a flow chart showing an exemplary process for providing RHIND server software associated with selection of an object class attribute, which is used by the system of FIG. 1.
Figure 5B:
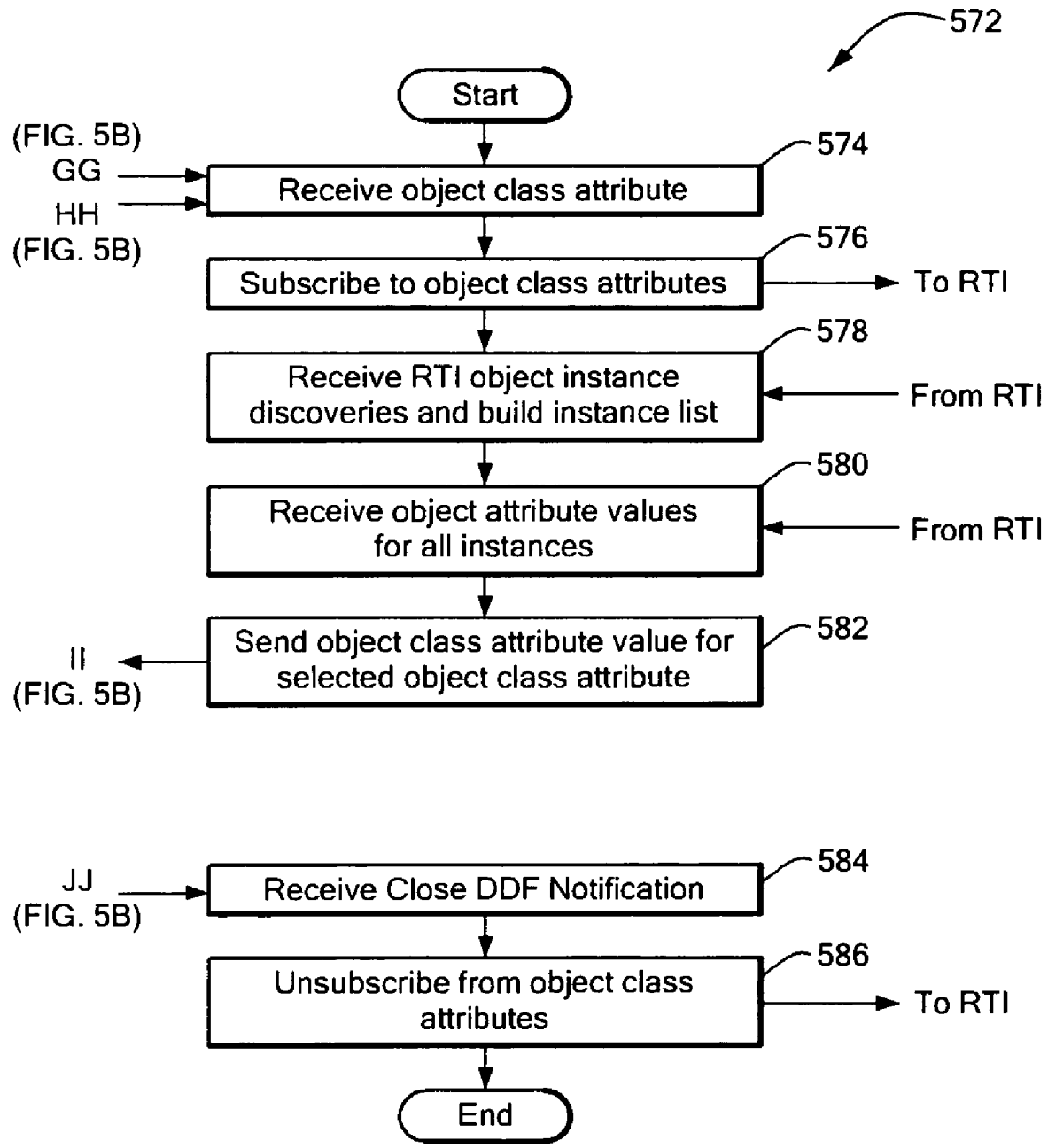
FIG. 5B is a flow chart showing an exemplary process for providing a web interaction federate associated with selection of an object class attribute, which is used by the system of FIG. 1.

Referring now to FIG. 5, letter reference designators AA-FF have corresponding letter reference designators AA-FF on FIG. 5A, to which they couple. FIGS. 5, 5A, and 5B can be taken together to show the interactions between a web client application (FIG. 5), RHIND server software (FIG. 5A), and a web interaction federate (WIF) (FIG. 5B). However, the figures are discussed separately below.

Blocks 502-510 provide the same functions as blocks 302-310 of FIG. 3 and blocks 522-524 provide the same functions as blocks 326-328 of FIG. 3 and are not discussed here again.

The user can provide a request to open an object class attribute list, which is received at block 512. The receipt of the request to open the object class attribute list at block 512 results, at block 514, in the object class attribute list being displayed, for example as a menu on a graphical user interface (e.g., FIGS. 5A, 5C). Unlike the object instances and associated object instance list in block 316 of FIG. 3, which are received from the HLA federation execution, the object class attributes and associated list are provided by the opened DDF received at block 510 with FIGS. 5-5D.

The user can select an object class attribute associated with the object class attribute list displayed at block 514, and the selection is received at block 516. At block 518, in response to the object class attribute selection received at block 516, the web client application sends the object class attribute selection to the RHIND server software of FIG. 3A.

At block 520, in response to the object class attribute selection sent at block 518, an associated object attribute value is received and displayed in conjunction with a display element in the DDF opened at block 510.

Referring now to FIG. 5A, a process 540 is associated with RHIND server software, for example the RHIND server software 20 of FIG. 1. Letter reference designators AA-FF have corresponding letter reference designators AA-FF on FIG. 5, corresponding to the web client application to which they couple. Letter reference designators GG-JJ have corresponding letter reference designators GG-JJ on FIG. 5B, corresponding to a web interaction federate to which they couple.

Blocks 542-550 provide the same functions as blocks 336-344 of FIG. 3A and blocks 560-566 provide the same functions as blocks 362-368 of FIG. 3A and are not discussed here again.

At block 552, an object class attribute selection is received, for example, from the web client application of FIG. 5 (block 518). In response to the object class attribute selection received at block 552, the RHIND server software issues a request for the object class attribute selection at block 554, for example, to the web interaction federate of FIG. 5B. In response, an associated object attribute value is received at block 556 from the web interaction federate of FIG. 5B, which is then sent at block 558 to the web client application of FIG. 5 (block 520) for display.

Referring now to FIG. 5B, a process 374 is associated with a web interaction federate (WIF), for example the web interaction federate 18 of FIG. 1. Letter reference designators I-N have corresponding letter reference designators I-N on FIG. 5A, corresponding to the RHIND server software to which they couple.

Blocks 584-586 provide the same functions as blocks 394-396 of FIG. 3B and are not discussed here again.

Blocks 574-580 provide similar functions as blocks 376-382 of FIG. 3B. However, an object class attribute is received at block 574 either in response to an open DDF as received from block 550 of FIG. 5A (similar to block 376 of FIG. 3A) or from block 554 of FIG. 5A, which provides a user selection of an object class attribute.

At block 582, the object class attribute value in accordance with the object class attribute received at block 574 is sent to the RHIND server software of FIG. 5A (block 556).

As described above, the object class attribute received at block 574 can be received from two paths.

In view of the processes 500, 540, 572 of FIGS. 5, 5A, and 5B, respectively, it should be apparent that a user can initiate a change to an object attribute value associated with a display element, for example, by a selection of an object class attribute at block 516 of FIG. 5. The object class attribute, and therefore, the associated object attribute value, can be dynamically updated while the HLA federation executes.

Figure 6:
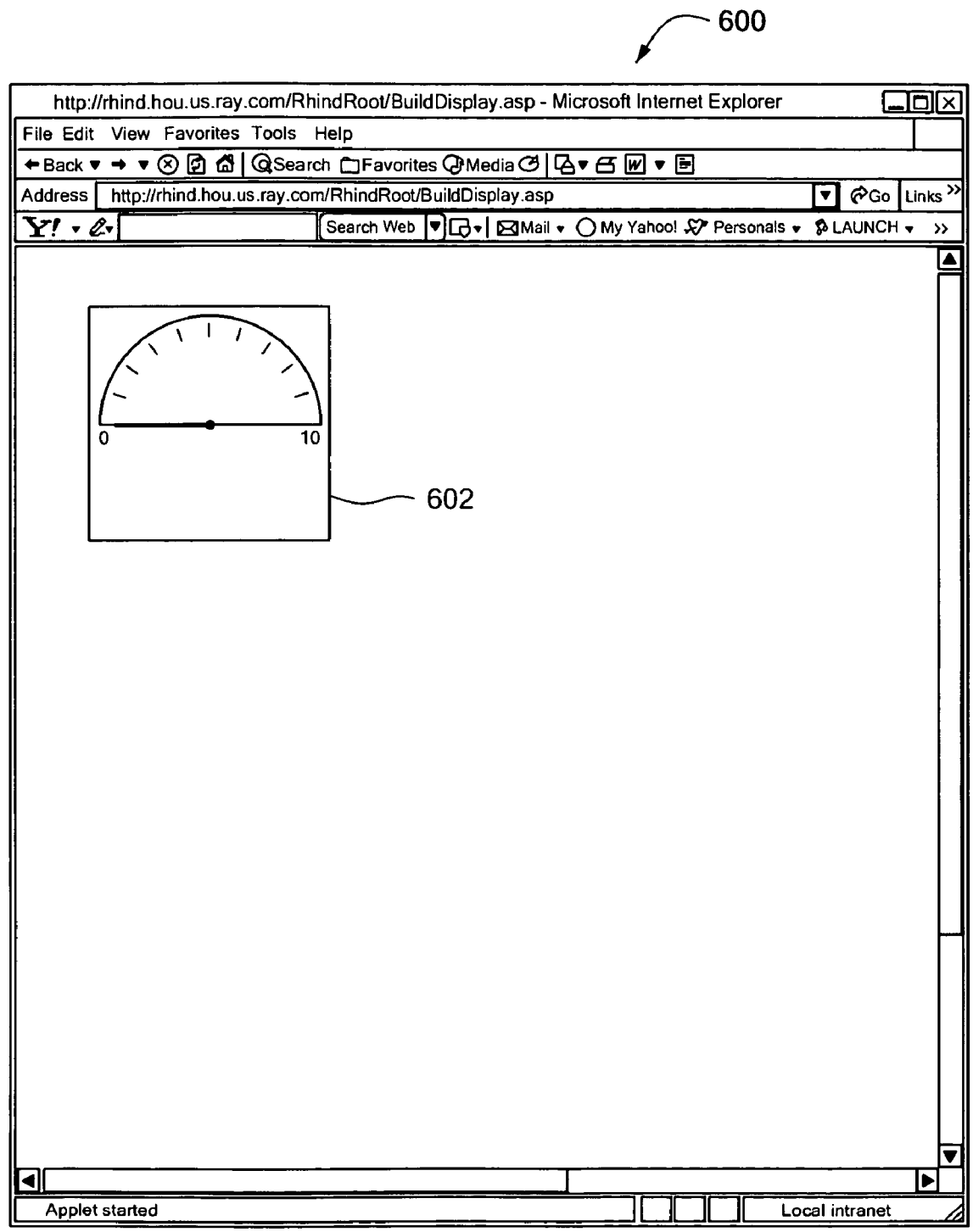
FIGS. 6-6D are pictorials showing exemplary graphical user interfaces associated with the processes of FIGS. 5-5B.
Figure 6A:
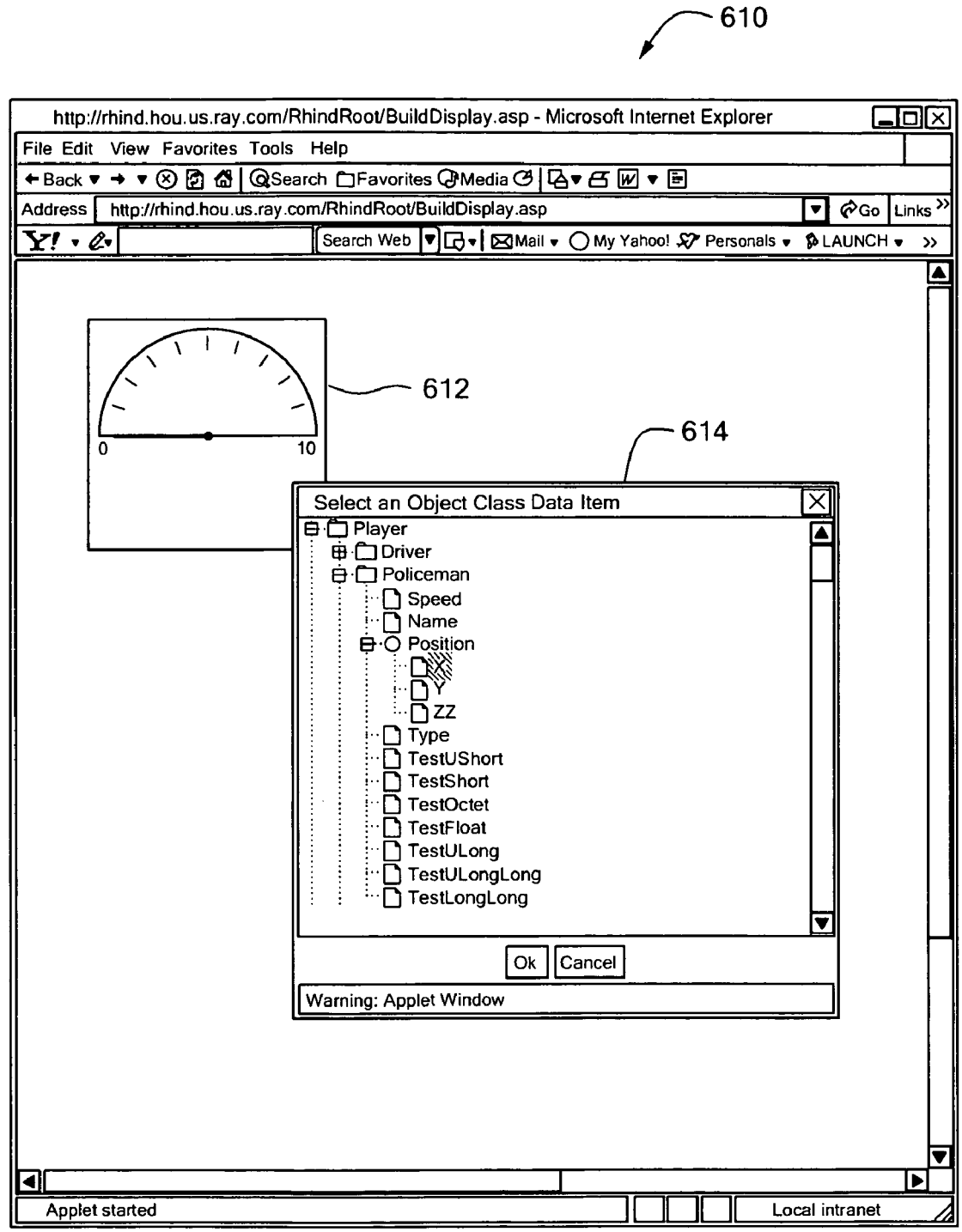
Figure 6B:
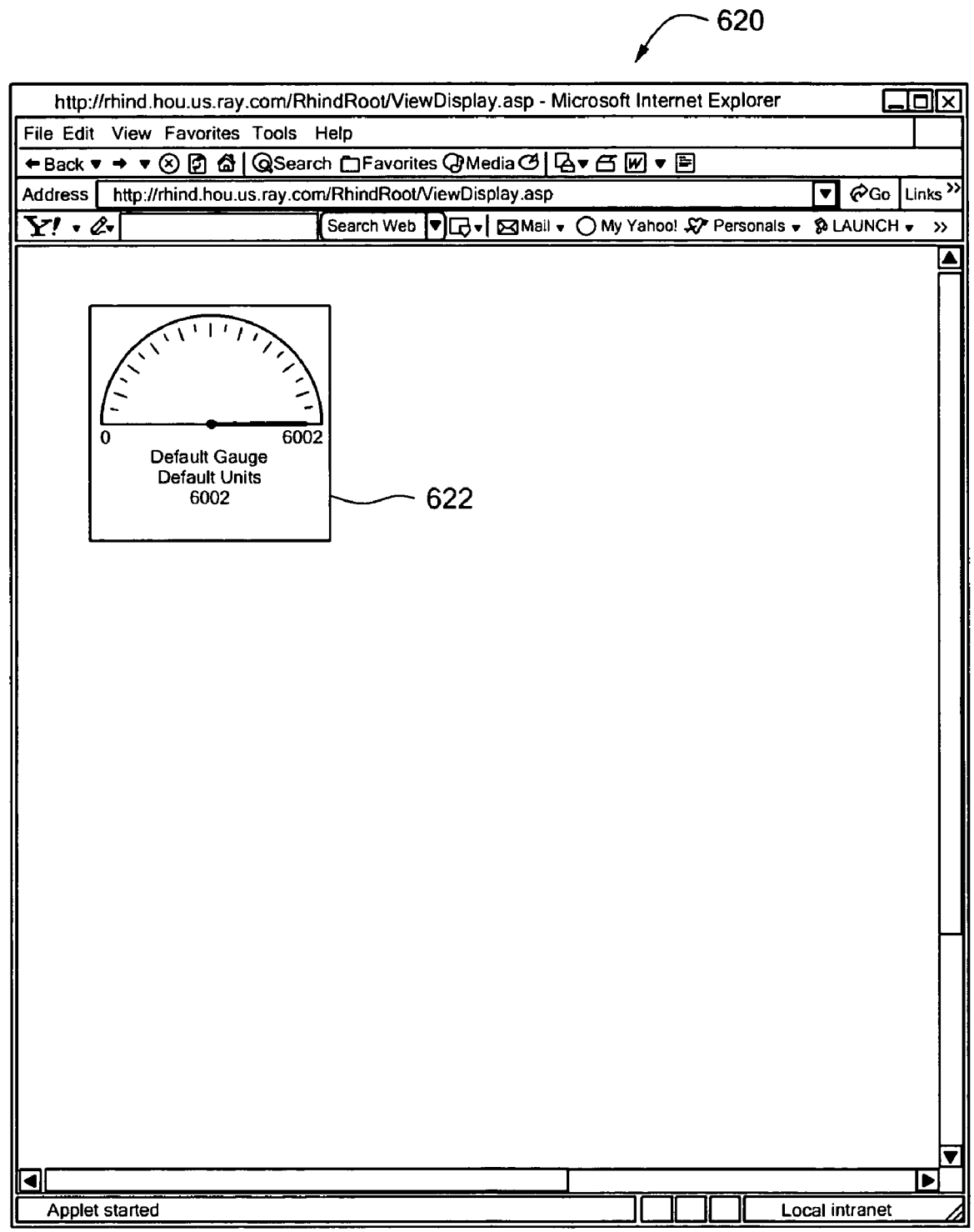
Figure 6C:
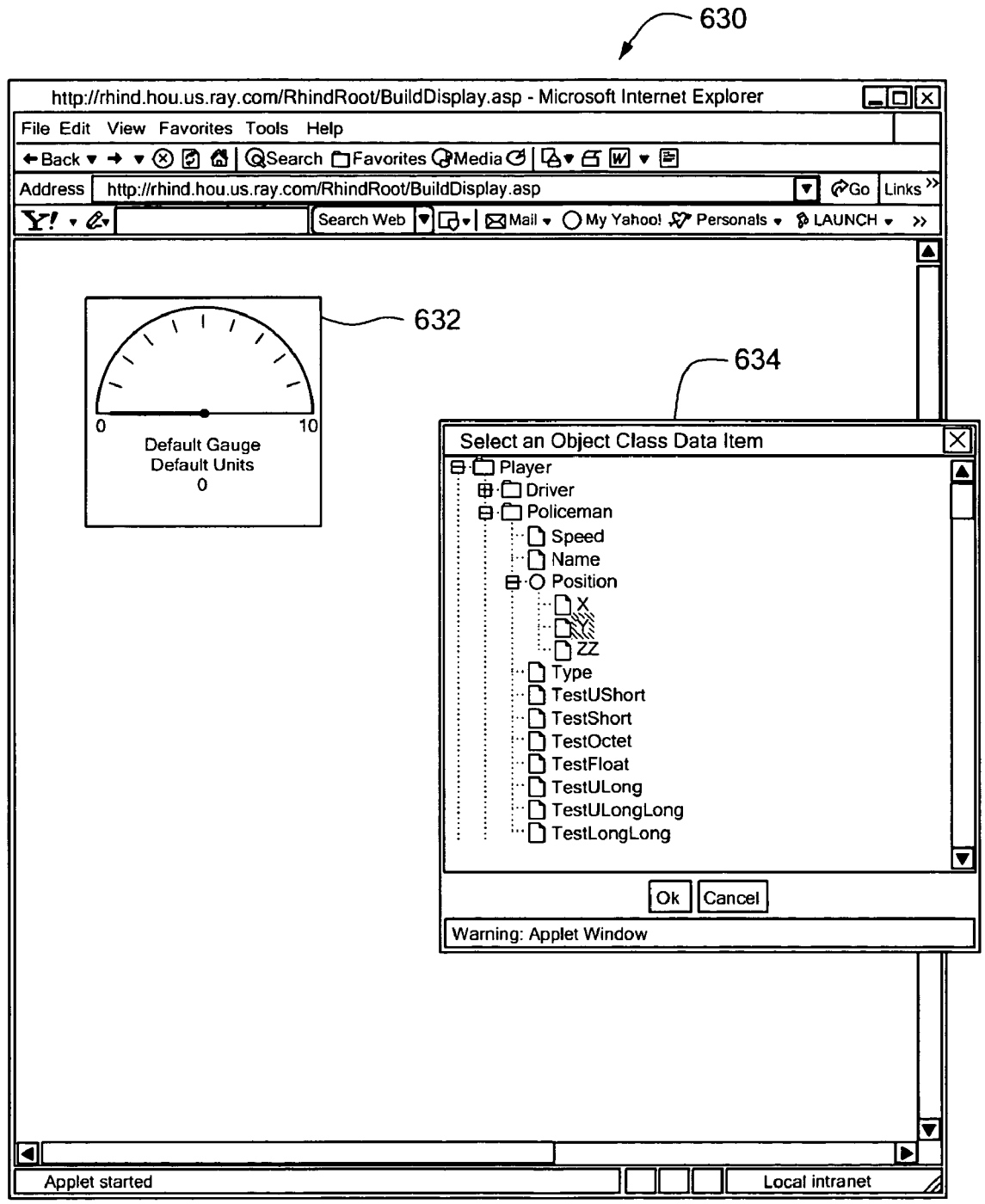
Figure 6D:
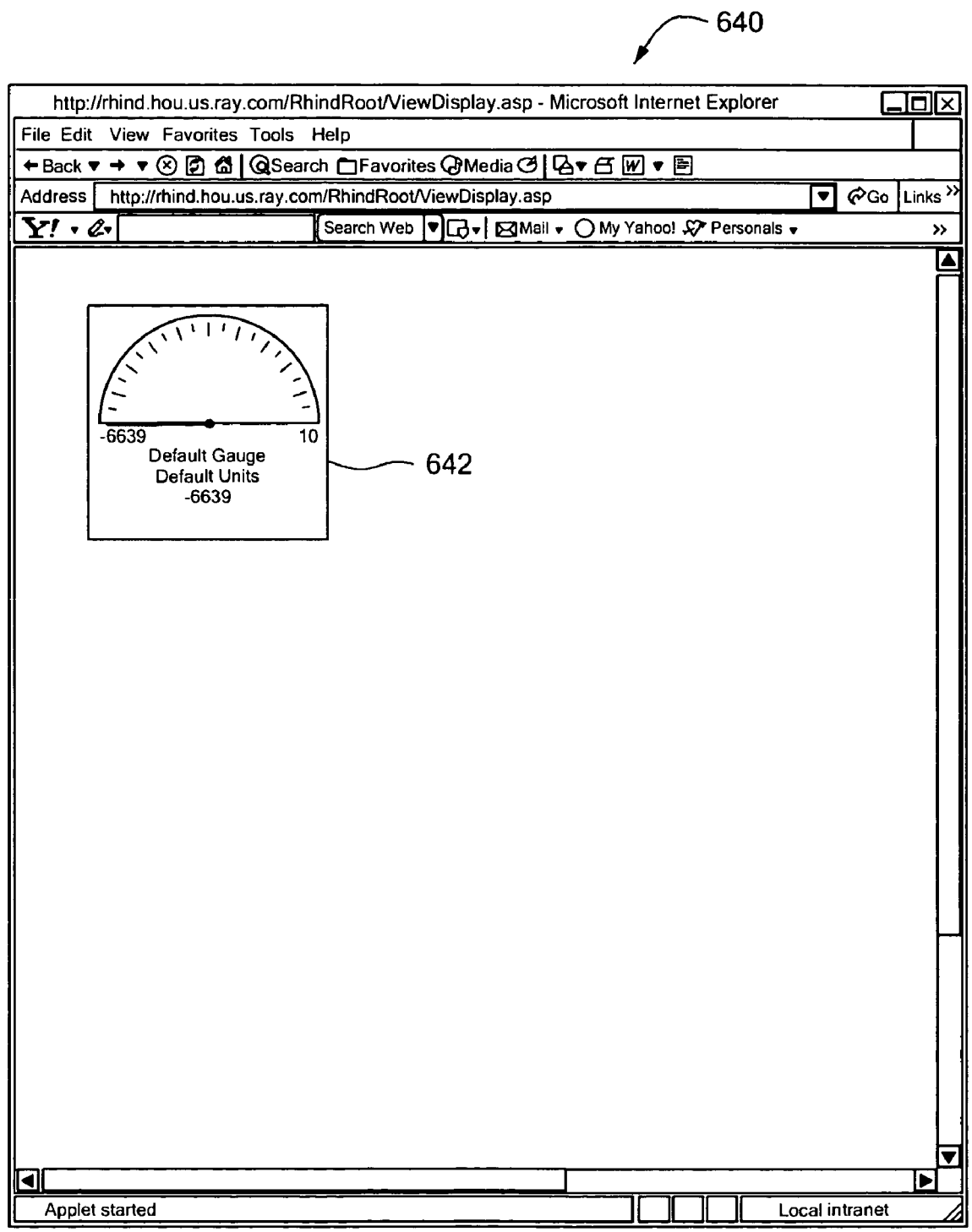

FIGS. 6-6D show graphical user interfaces according to the processes of FIGS. 5-5B. Referring first to FIG. 6, an exemplary graphical user interface 600 includes a display element 602, which is a dial gauge. The display element has no associated data, as would be provided, for example, at blocks 502 and 510 of FIG. 5.

Referring now to FIG. 6A, another exemplary graphical user interface 610 includes a display element 612, which is a dial gauge, and a menu 614. The menu provides a list of object class attributes as would be provided, for example, at block 514 of FIG. 5. In this example, the object class attributes are positions of vehicles used in an HLA federation execution. The user can select an object class attribute, here position X, for example, at block 516 of FIG. 5.

Referring now to FIG. 6B, another exemplary graphical user interface 620 includes a display element 622, which is a dial gauge. The display element 622 now shows data corresponding to an object attribute value, for the selected object class attribute (position X), selected in the menu 614 of FIG. 6A. In this example, the object attribute value corresponds to a position of 6002 (in arbitrary units).

The displayed object attribute value in the display element 622 corresponds to block 520 of FIG. 5. It should be recognized that the object attribute value (position) is provided in the display element 622 while the HLA federation executes.

Referring now to FIG. 6C, another exemplary graphical user interface 630 includes a display element 632, which is a dial gauge, and a menu 634. The menu again provides the list of object class attributes (e.g., menu 614, FIG. 6A) as would be provided, for example, at block 514 of FIG. 5. In this example, the object class attributes are positions of vehicles used in the HLA federation execution. The user can select an object class attributes, here position Y, for example, at block 516 of FIG. 5.

Referring now to FIG. 6D, another exemplary graphical user interface 640 includes a display element 642, which is a dial gauge. The display element 642 now shows data corresponding to another object attribute value, for the object class attribute (position Y) selected in the menu 634 of FIG. 6C. In this example, the object attribute value corresponds to a position of −6639 (in arbitrary units).

The displayed object attribute value in the display element 642 corresponds to block 520 of FIG. 5. It should be recognized that the object attribute value (position) is again provided in the display element 642 while the HLA federation executes.

Figure 7:
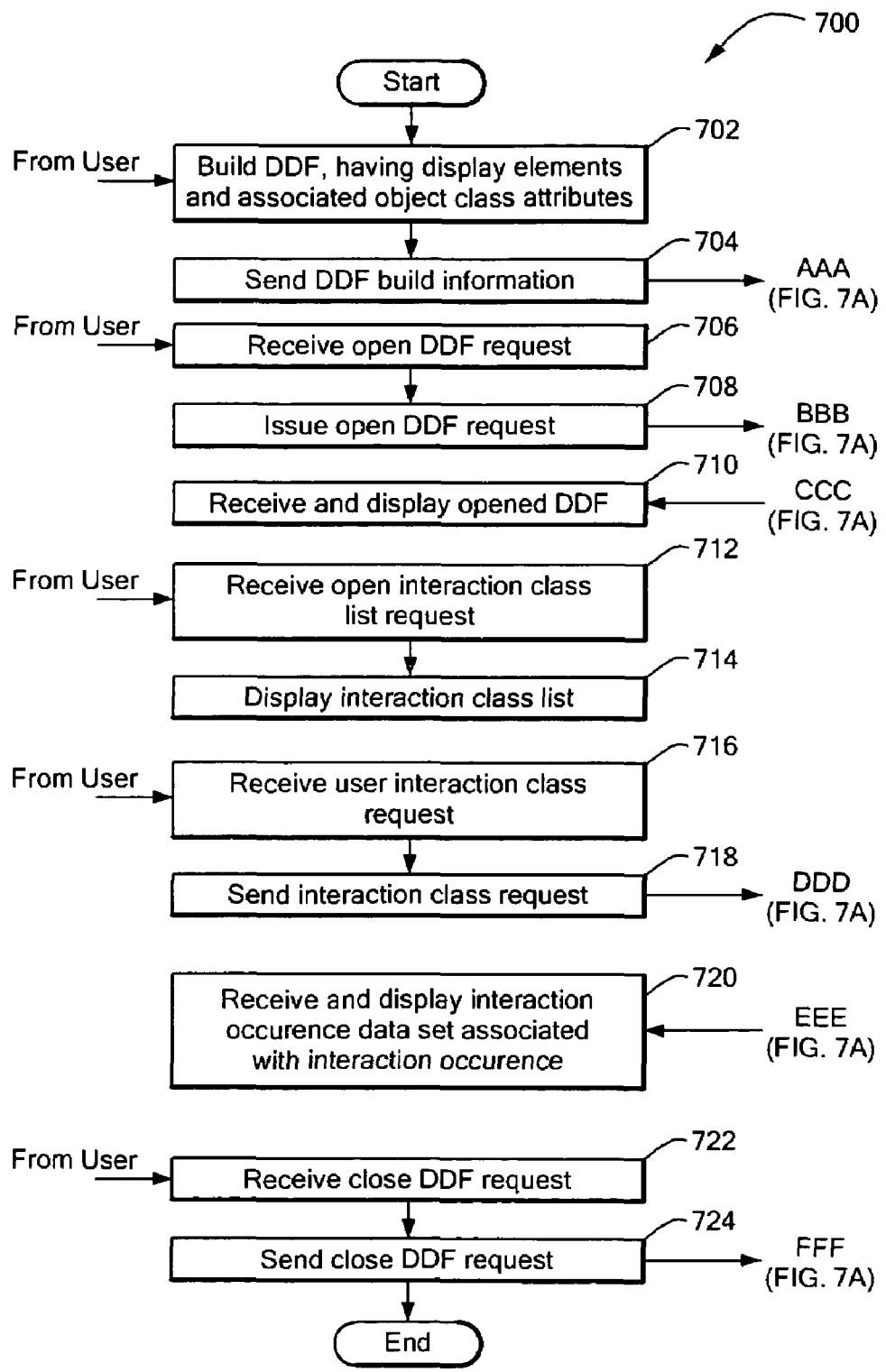
FIG. 7 is a flow chart showing an exemplary process for providing a web client application associated with selection of an interaction class, which is used by the system of FIG. 1.
Figure 7A:
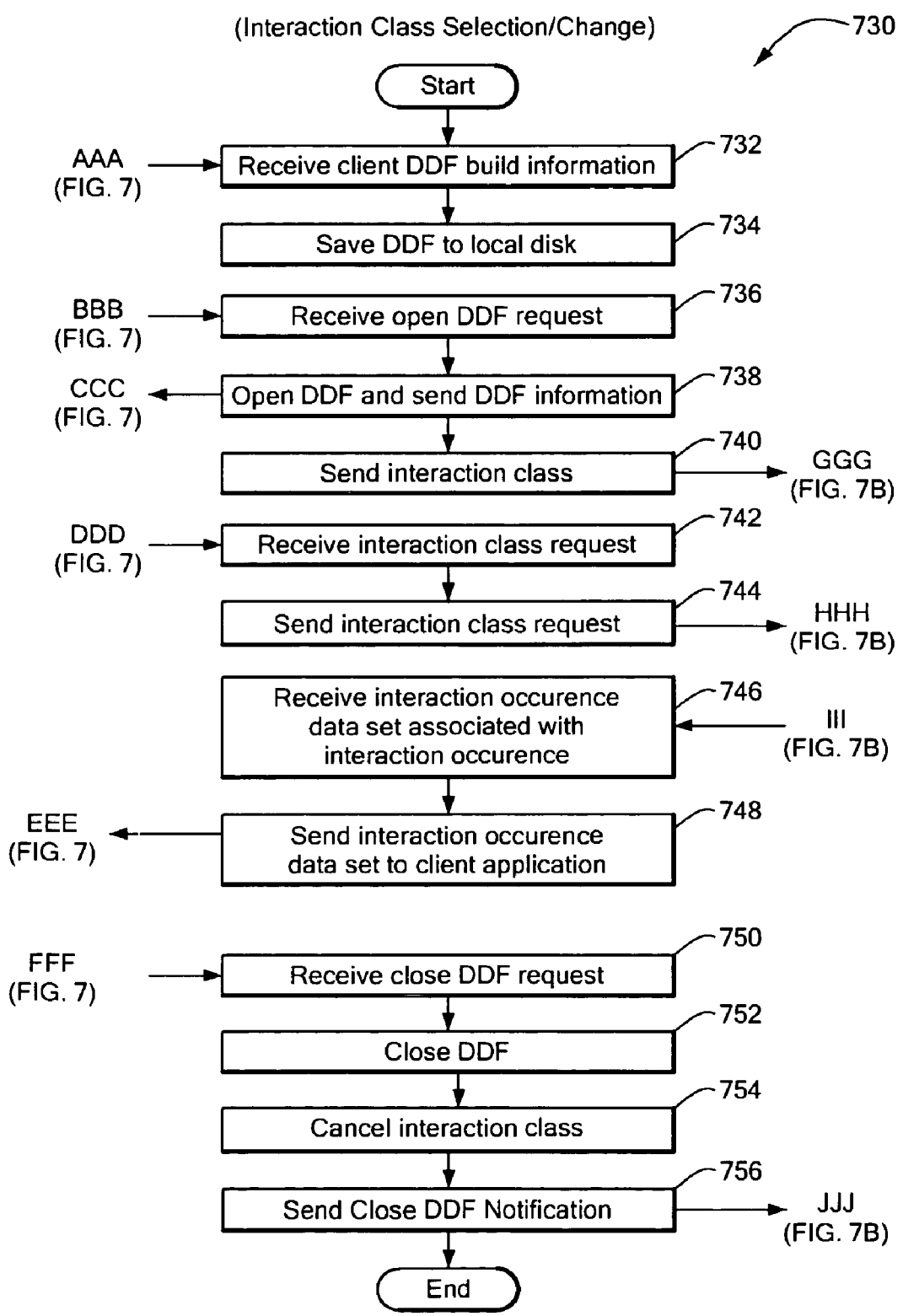
FIG. 7A is a flow chart showing an exemplary process for providing RHIND server software associated with selection of an interaction class, which is used by the system of FIG. 1.
Figure 7B:
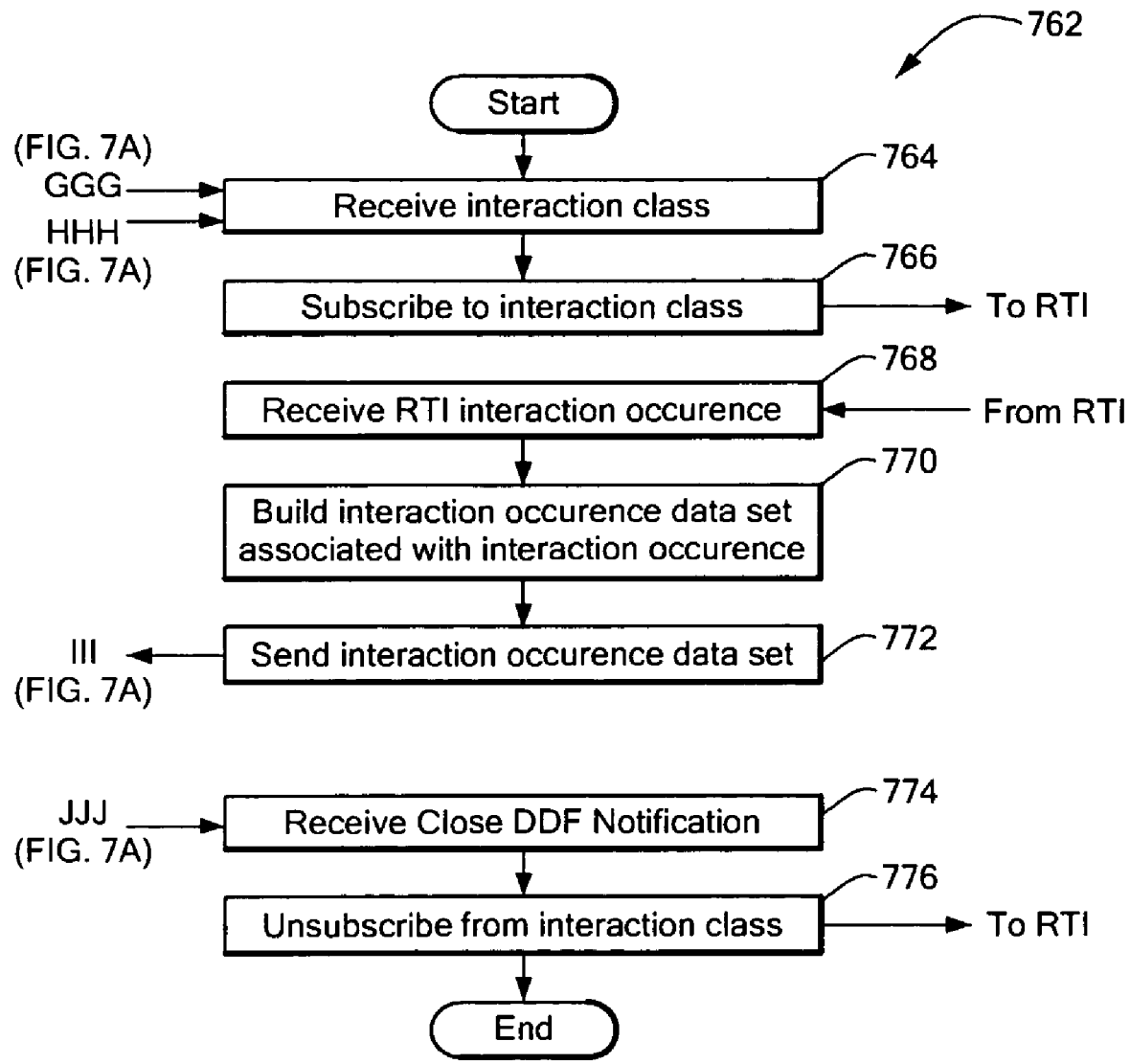
FIG. 7B is a flow chart showing an exemplary process for providing a web interaction federate associated with selection of an interaction class, which is used by the system of FIG. 1.

In the display elements 612, 622, 632, and 642 of FIGS. 6-6D, the text "Default Gauge" and "Default Units" can be replaced by a user with any desired text. Referring now to FIG. 7, letter reference designators AAA-FFF have corresponding letter reference designators AAA-FFF on FIG. 7A, to which they couple. FIGS. 7, 7A, and 7B can be taken together to show the interactions between a web client application (FIG. 7), RHIND server software (FIG. 7A), and a web interaction federate (WIF) (FIG. 7B). However, the figures are discussed separately below.

Blocks 702-710 provide the same functions as blocks 302-310 of FIG. 3 and blocks 722-724 provide the same functions as blocks 326-328 of FIG. 3 and are not discussed here again.

The user can provide a request to open an interaction class list, which is received at block 712. The receipt of the request to open the interaction class list at block 712 results, at block 714, in the interaction class list being displayed, for example, as a menu on a graphical user interface (e.g., FIGS. 8A, 8C). Unlike the object instances and associated object instance list in block 316 of FIG. 3, which are received from the HLA federation execution, the interaction classes and associated interaction class list are provided by the open DDF received at block 710.

The user can select an interaction class associated with the interaction class list displayed at block 714, and the selection is received at block 716. At block 718, in response to the object interaction class selection received at block 716, the web client application sends the interaction class selection to the RHIND server software of FIG. 7A.

At block 720, in response to the interaction class selection sent at block 718, an associated interaction occurrence data set is received and displayed in conjunction with a display element in the DDF opened at block 710. The interaction occurrence data set can include, but is not limited to, a time of an occurrence of the interaction, an interaction class, an interaction class parameter, and the interaction parameter value, each associated with the occurrence of the interaction.

Referring now to FIG. 7A, a process 730 is associated with RHIND server software, for example the RHIND server software 20 of FIG. 1. Letter reference designators AAA-FFF have corresponding letter reference designators AAA-FFF on FIG. 7, corresponding to the web client application to which they couple. Letter reference designators GGG-JJJ have corresponding letter reference designators GGG-JJJ on FIG. 7B, corresponding to a web interaction federate to which they couple.

Blocks 732-738 provide the same functions as blocks 336-342 of FIG. 3A and are not discussed here again.

At block 740, an interaction class associated with the opened DDF is sent, for example, to the web interaction federate of FIG. 5B. At block 742 an interaction class request is received, for example, from the web client application of FIG. 7 (block 718). In response to the interaction class request received at block 742, the RHIND server software issues the interaction class selection at block 744, for example, to the web interaction federate of FIG. 7B. In response, an interaction occurrence data set is received at block 746 from the web interaction federate of FIG. 5B, which is then sent at block 748 to the web client application of FIG. 7 (block 720) for display.

The receipt of the interaction occurrence data set at block 746, and the display thereof at block 720 of FIG. 7, occurs upon an occurrence of an interaction having the requested interaction class.

Referring now to FIG. 7B, a process 762 is associated with a web interaction federate (WIF), for example the web interaction federate 18 of FIG. 1. Letter reference designators GGG-JJJ have corresponding letter reference designators GGG-JJJ on FIG. 5A, corresponding to the RHIND server software to which they couple.

At block 764, an interaction class is received, for example, from the RHIND server software (block 740). The interaction class received at block 764 can also be the result of an interaction class selection provided by a user, for example, via the RHIND server software (block 744).

At block 766, the web interaction federate joins and subscribes to a federation (interaction class), for example, the federation 16 of FIG. 1. The web interaction federate is then able to receive, from the federation, occurrences of an interaction corresponding to the interaction class received at block 764 and an associated interaction occurrence data set.

At block 768, the WIF receives an indication that an interaction has occurred in a running HLA federation execution, running on the federation. At block 770, the WIF builds an interaction occurrence data set accordingly, which can include, but is not limited to, a time of the interaction occurrence, an interaction class according to the interaction class received at block 764, an associated interaction class parameter, and an associated interaction parameter value.

Figure 8:
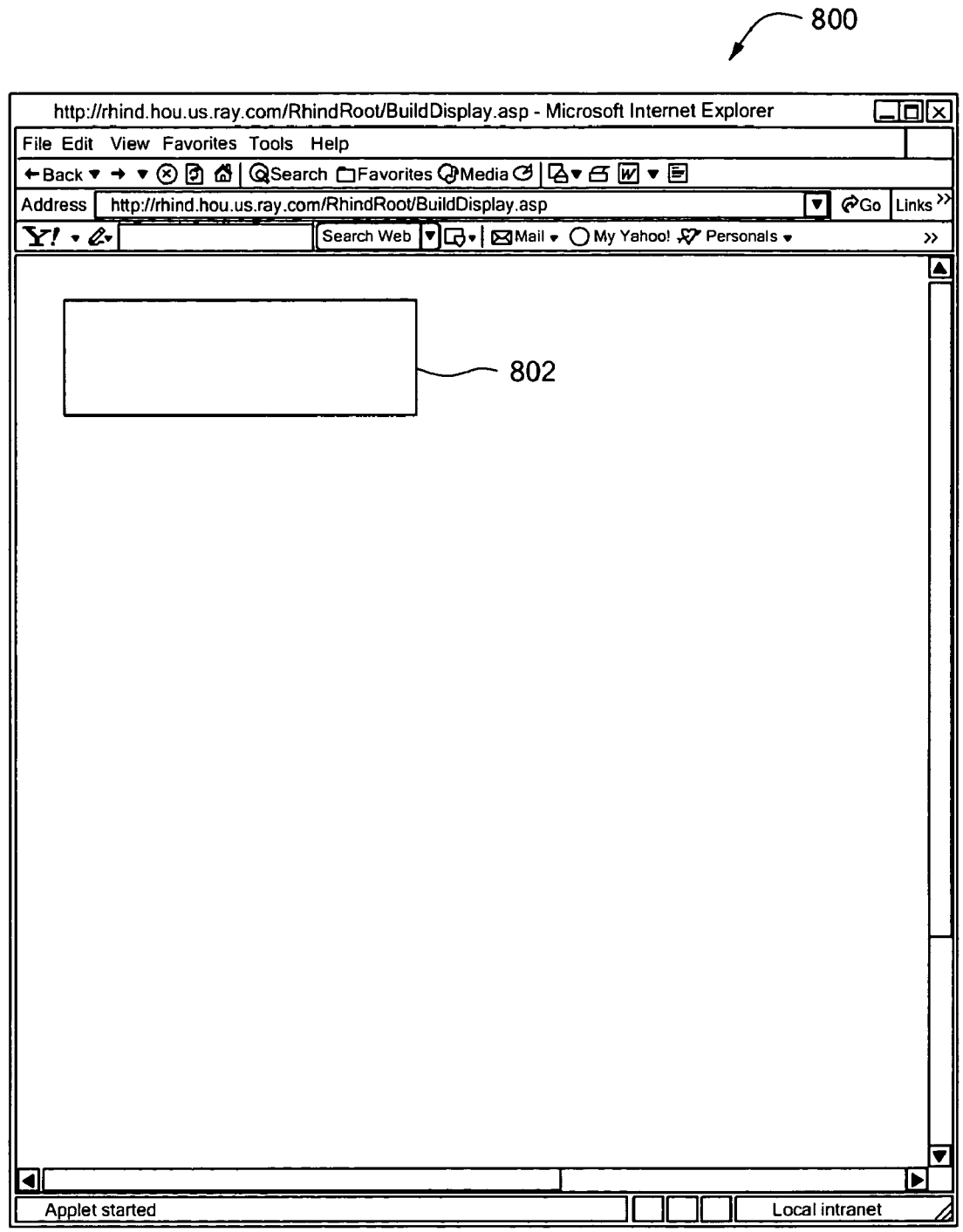
FIGS. 8-8D are pictorials showing exemplary graphical user interfaces associated with the processes of FIGS. 7-7B.
Figure 8A:
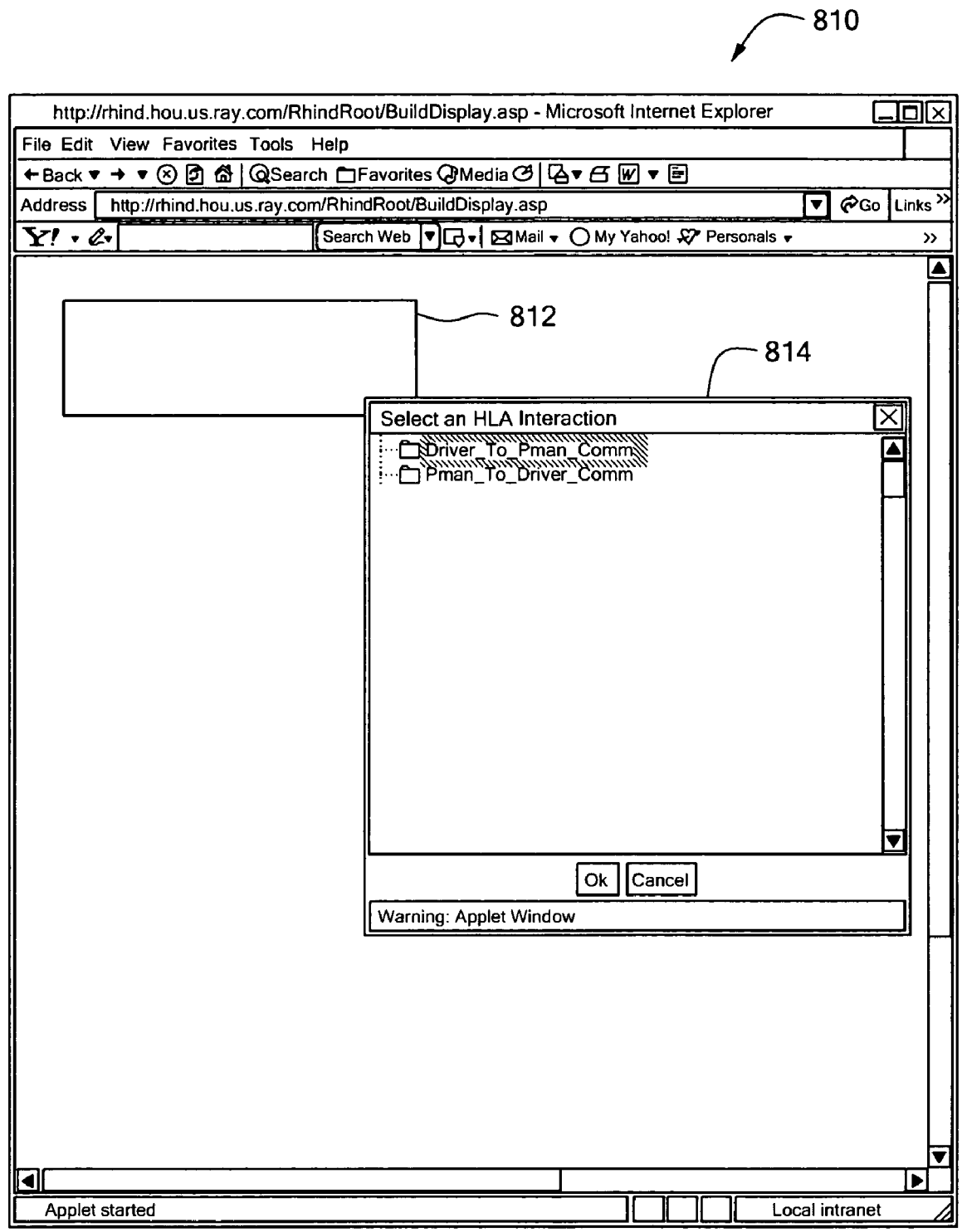

Referring now to FIG. 8A, another exemplary graphical user interface 810 includes a display element 812, which is a text box, and a menu 814. The menu provides a list interaction classes as would be provided, for example, at block 714 of FIG. 7. In this example, the interaction classes are indicative of driver to police and police to driver communications used in an HLA federation execution. The user can select an interaction class, here Driver_To_Pman_Comm, for example, at block 716 of FIG. 7.

Figure 8B:
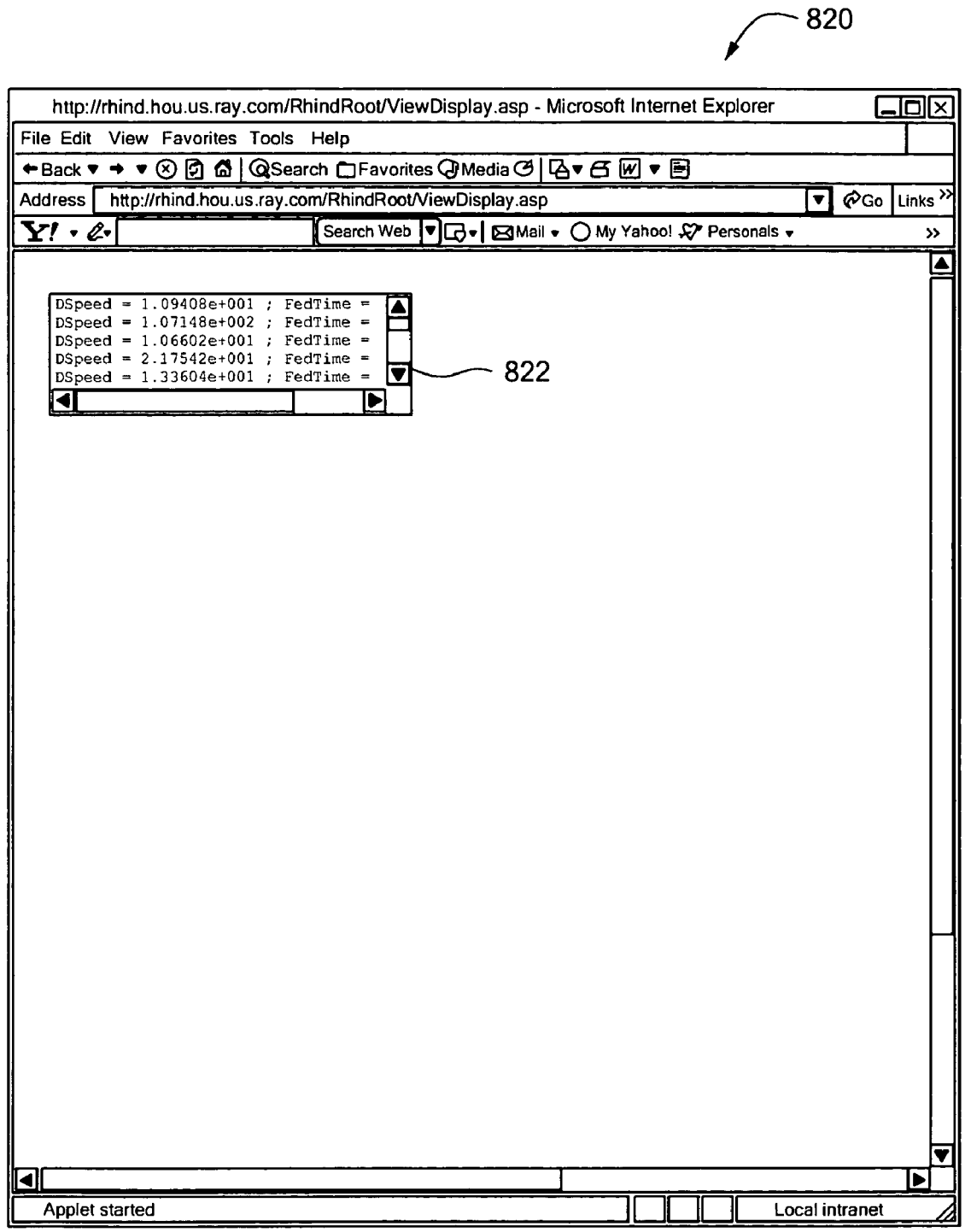

Referring now to FIG. 8B, another exemplary graphical user interface 820 includes a display element 822, which is a text box. The display element 822 now shows data corresponding to an interaction occurrence data set, for the selected interaction class (Driver_To_Pman_Comm,), selected in the menu 814 of FIG. 8A. In this example, the interaction occurrence data set includes driver speed (Dspeed) and HLA federation execution time (FedTime). Each text line corresponds to an occurrence of an interaction.

The displayed interaction occurrence data set in the display element 822 corresponds to block 720 of FIG. 7. It should be recognized that the interaction occurrence data set is provided in the display element 822 while the HLA federation executes.

Figure 8C:
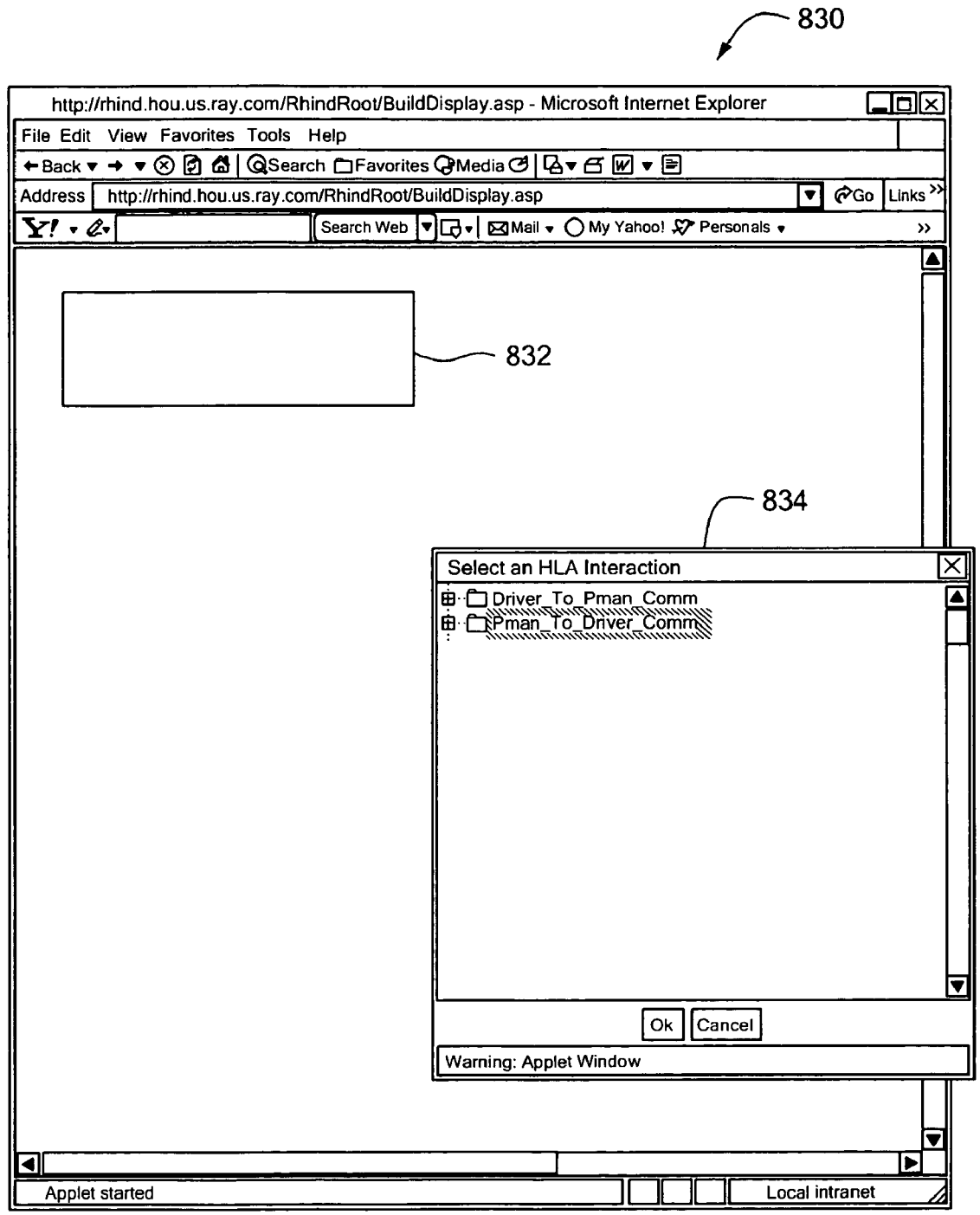

Referring now to FIG. 8C, another exemplary graphical user interface 830 includes a display element 832, which is a text box, and a menu 834. The menu again provides the list of interaction classes (e.g., menu 814, FIG. 8A) as would be provided, for example, at block 714 of FIG. 7. In this example, as described above, the interaction classes are indicative of driver to police and police to driver communications used in an HLA federation execution. The user can select an interaction class, here Pman_To_Driver_Comm, for example, at block 716 of FIG. 7.

Figure 8D:
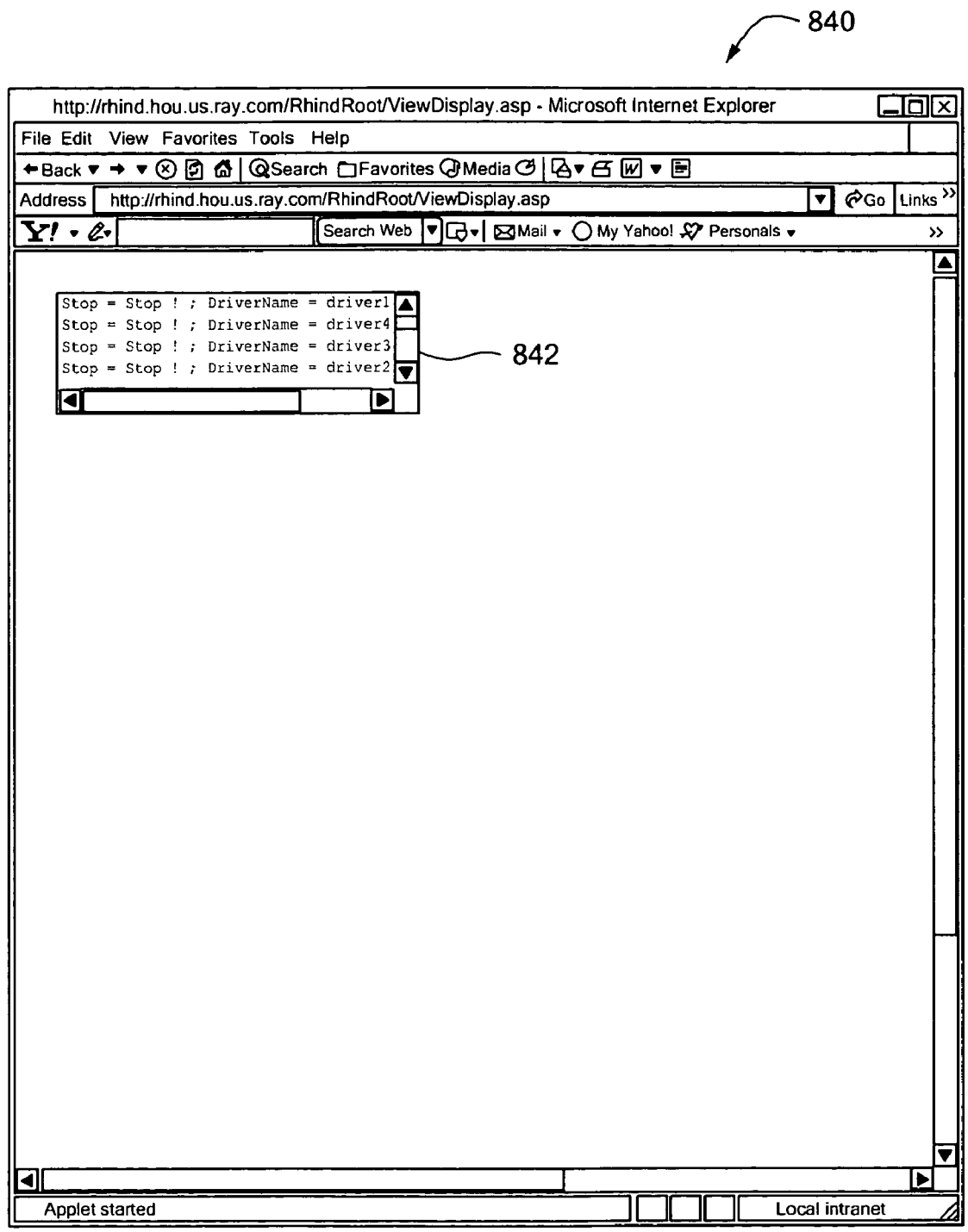

Referring now to FIG. 8D, another exemplary graphical user interface 840 includes a display element 842, which is a text box. The display element 842 now shows data corresponding to another interaction occurrence data set, for the interaction class selected in the menu 834 of FIG. 8C. In this example, the interaction occurrence data set includes another driver speed (Dspeed) and another HLA federation execution time (FedTime). Each text line corresponds to an occurrence of an interaction.

The displayed interaction occurrence data set in the display element 842 corresponds to block 720 of FIG. 7. It should be recognized that the interaction occurrence data set is again provided in the display element 842 while the HLA federation executes.

Figure 9:
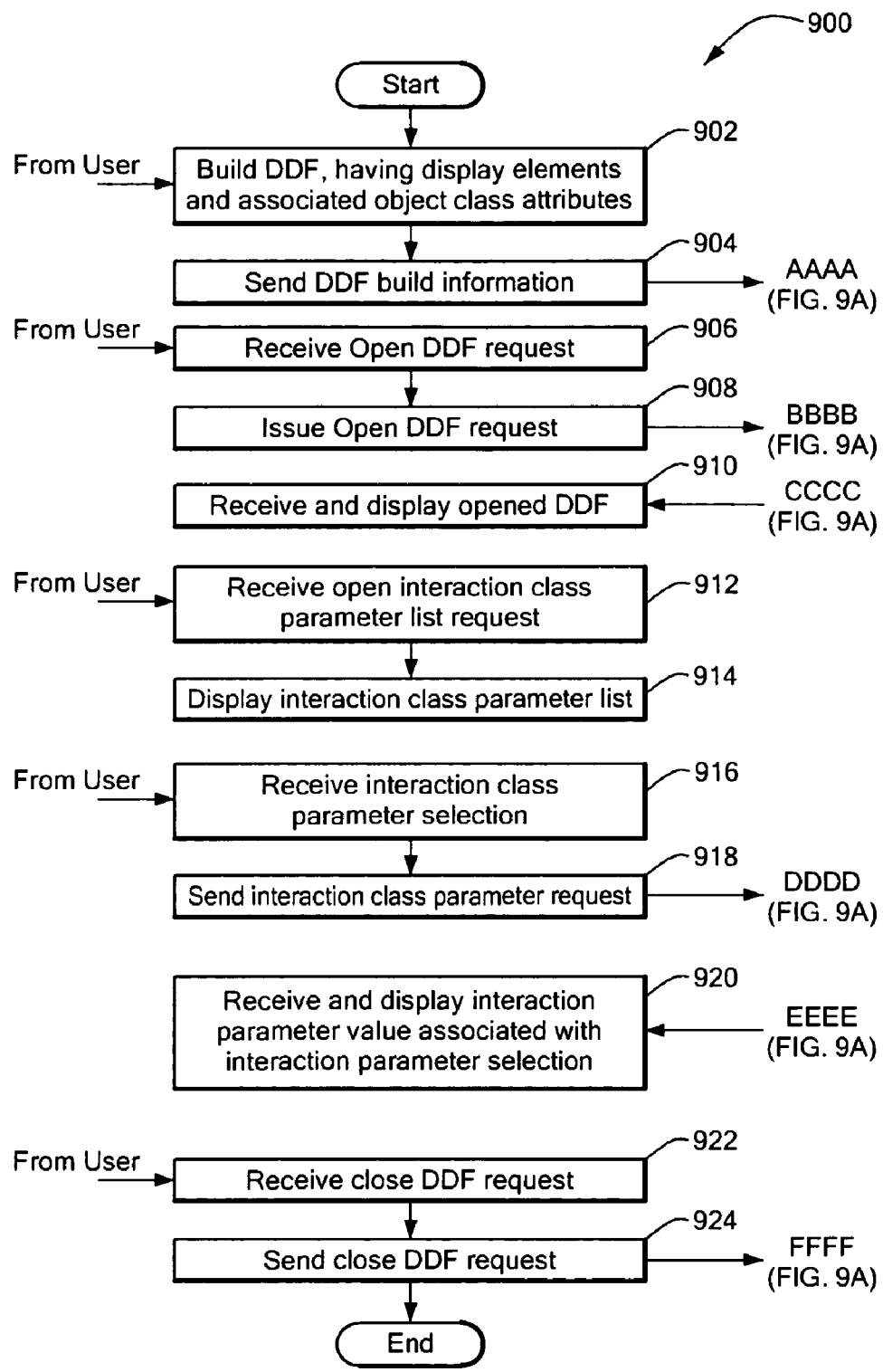
FIG. 9 is a flow chart showing an exemplary process for providing a web client application associated with selection of an interaction class parameter, which is used by the system of FIG. 1.
Figure 9A:
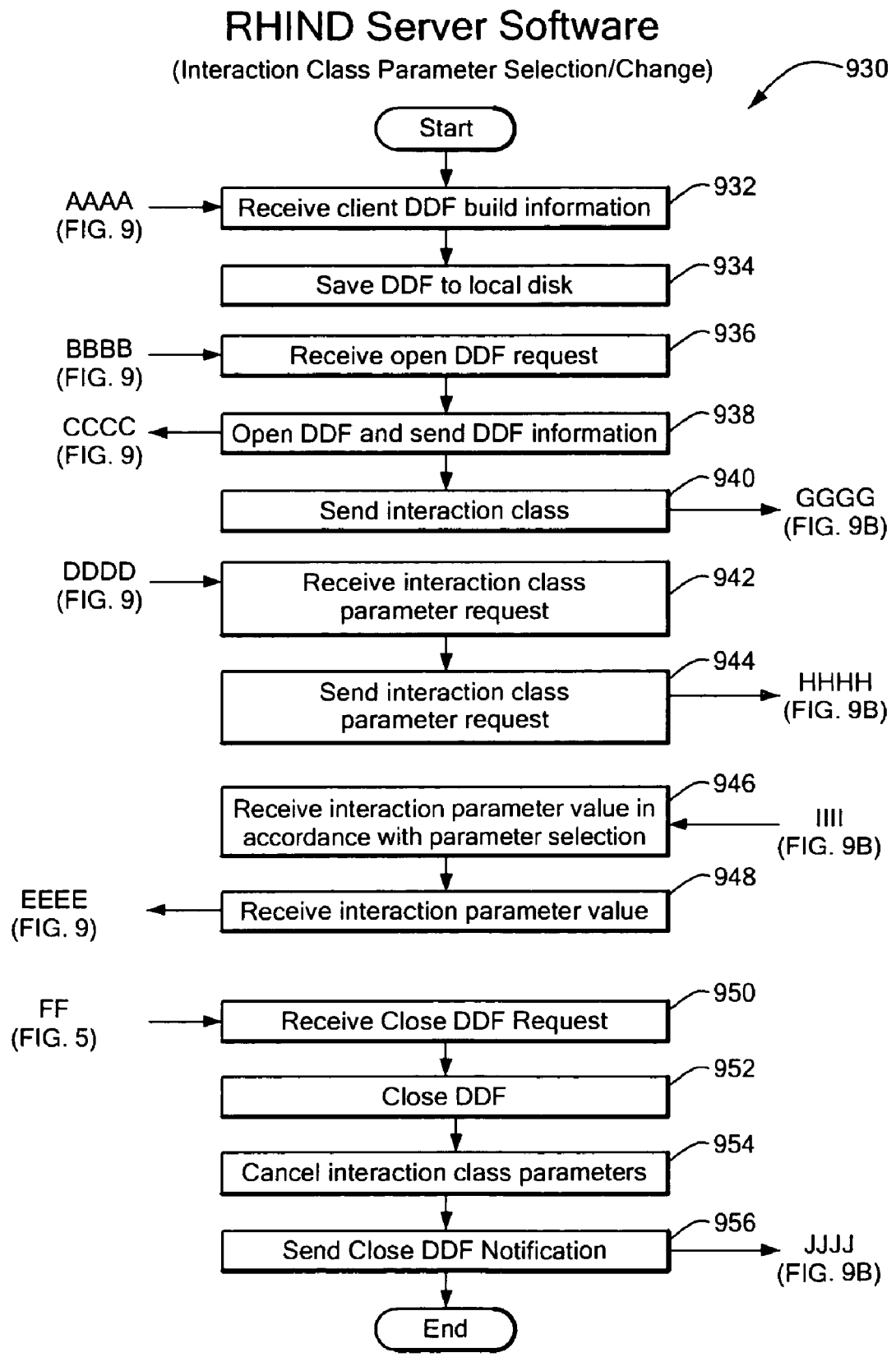
FIG. 9A is a flow chart showing an exemplary process for providing RHIND server software associated with selection of an interaction class parameter, which is used by the system of FIG. 1.
Figure 9B:
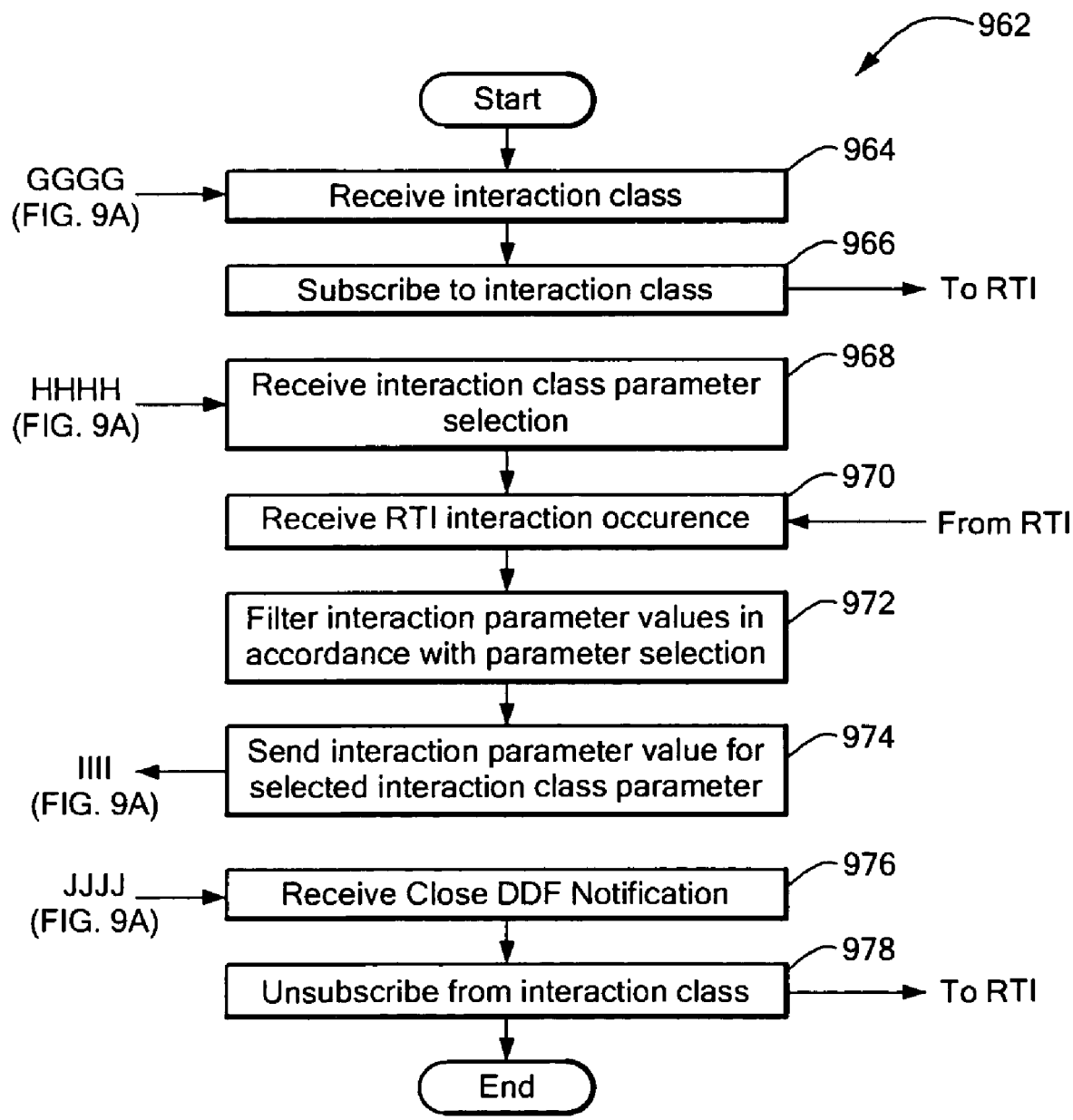
FIG. 9B is a flow chart showing an exemplary process for providing a web interaction federate associated with selection of an interaction class parameter, which is used by the system of FIG. 1.

Referring now to FIG. 9, letter reference designators AAAA-FFFF have corresponding letter reference designators AAAA-FFFF on FIG. 9A, to which they couple. FIGS. 9, 9A, and 9B can be taken together to show the interactions between a web client application (FIG. 9), RHIND server software (FIG. 9A), and a web interaction federate (WIF) (FIG. 9B). However, the figures are discussed separately below.

Blocks 902-910 provide the same functions as blocks 302-310 of FIG. 3 and blocks 922-924 provide the same functions as blocks 326-328 of FIG. 3 and are not discussed here again.

The user can provide a request to open an interaction class parameter list, which is received at block 912. The receipt of the request to open the interaction class parameter list at block 912 results, at block 914, in the interaction class parameter list being displayed, for example as a menu on a graphical user interface (e.g., FIGS. 9A, 9C). Unlike the object instances and associated object instance list at block 316 of FIG. 3, which are received from the HLA federation execution, the interaction class parameters and associated interaction class parameter list are provided by the open DDF received at block 910.

The user can select an interaction class parameter associated with the interaction class parameter list displayed at block 914, and the selection is received at block 916. At block 918, in response to the object interaction class parameter selection received at block 916, the web client application sends the interaction class parameter selection to the RHIND server software of FIG. 9A.

At block 920, in response to the interaction class parameter selection sent at block 918, an associated interaction parameter value is received and displayed in conjunction with a display element in the DDF opened at block 910. The interaction parameter value is associated with an occurrence of the interaction in the running HLA federation execution.

Referring now to FIG. 9A, a process 930 is associated with RHIND server software, for example the RHIND server software 20 of FIG. 1. Letter reference designators AAAA-FFFF have corresponding letter reference designators AAAA-FFFF on FIG. 9, corresponding to the web client application to which they couple. Letter reference designators GGGG-JJJJ have corresponding letter reference designators GGGG-JJJJ on FIG. 9B, corresponding to a web interaction federate to which they couple.

Blocks 932-938 provide the same functions as blocks 336-342 of FIG. 3A and are not discussed here again.

At block 940, an interaction class associated with the opened DDF is sent, for example, to the web interaction federate of FIG. 9B. At block 942 an interaction class parameter request is received, for example, from the web client application of FIG. 5 (block 918). In response to the interaction class parameter request received at block 942, the RHIND server software issues the interaction class parameter selection at block 944, for example, to the web interaction federate of FIG. 9B. In response, an interaction parameter value is received at block 946 from the web interaction federate of FIG. 5B, which is then sent at block 948 to the web client application of FIG. 9 (block 920) for display.

The receipt of the interaction parameter value at block 946, and the display thereof at block 920 of FIG. 9, occurs upon an occurrence of an interaction having the requested interaction class parameter.

Referring now to FIG. 9B, a process 962 is associated with a web interaction federate (WIF), for example the web interaction federate 18 of FIG. 1. Letter reference designators GGGG-JJJJ have corresponding letter reference designators GGGG-JJJJ on FIG. 5A, corresponding to the RHIND server software to which they couple.

At block 964, an interaction class is received, for example, from the RHIND server software (block 940).

At block 966, the web interaction federate joins and subscribes to a federation, for example, the federation 16 of FIG. 1. The web interaction federate is then able to receive, from the federation, occurrences of an interaction corresponding to the interaction class received at block 964.

At block 968, the WIF receives an interaction class parameter selection form the user, for example, via the RHIND server software of FIG. 9A (block 944).

At block 970, the WIF receives an indication that an interaction has occurred in a running HLA federation execution. At block 972, the WIF filters the interaction parameter values available in the HLA federation execution in accordance with the interaction class parameter selection received at block 968. At block 974, the WIF sends an interaction parameter value according to the filtering of block 972, for example, to the RHIND server software of FIG. 9A (block 946).

At block 976, the WIF receives a notification that the DDF is being closed, for example, from the RHIND servers software of FIG. 9A (block 956). At block 978, the WIF unsubscribes from the interaction class to which it subscribed at block 966.

In view of the processes 900, 930, 962 of FIGS. 9, 9A, and 9B, respectively, it should be apparent that a user can initiate a change to an interaction parameter value associated with a display element, for example, by a selection of an interaction class parameter at block 916 of FIG. 9. The interaction class parameter, and therefore, the associated interaction parameter value, can be dynamically updated while the HLA federation executes.

Figure 10:
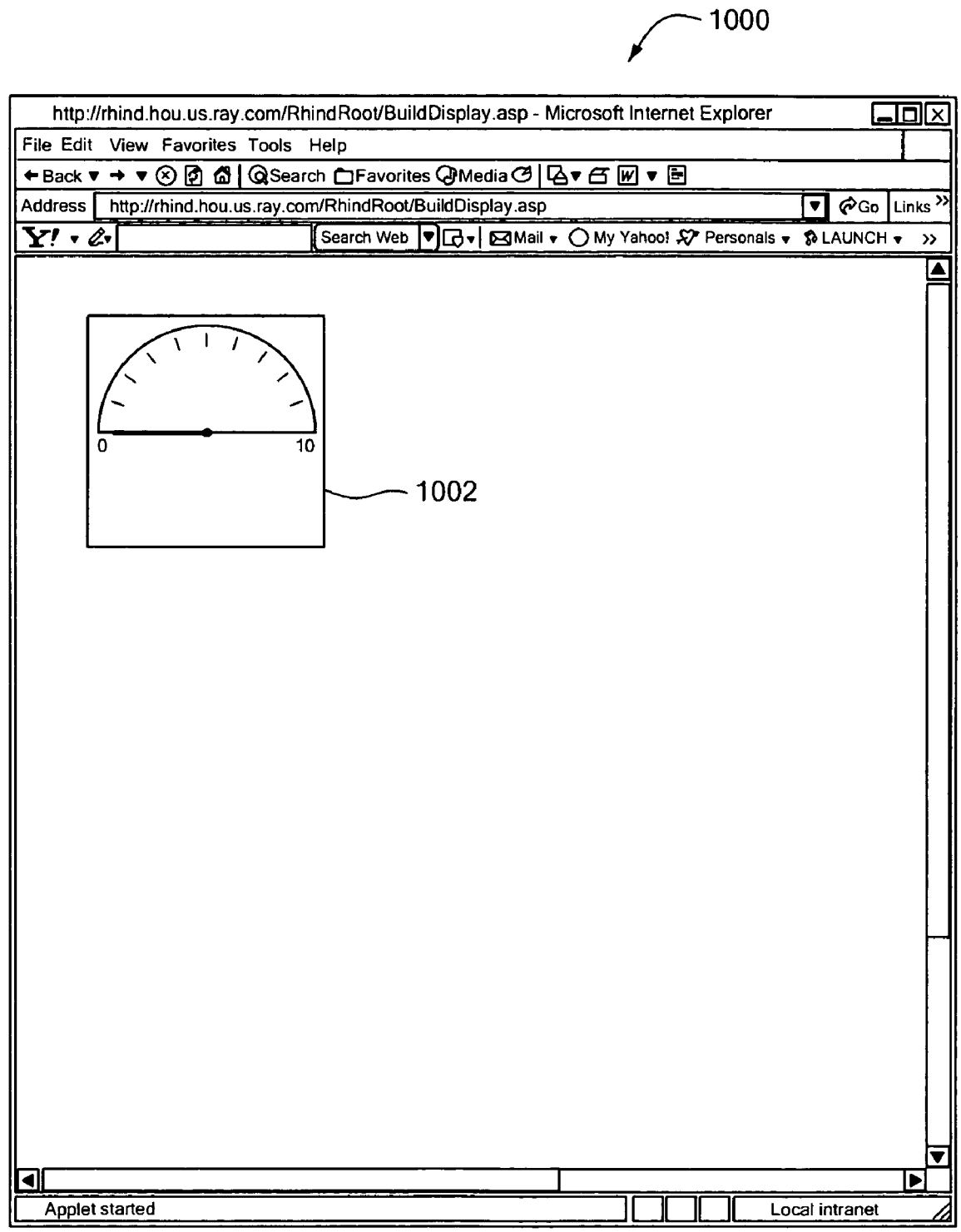
FIGS. 10-10D are pictorials showing exemplary graphical user interfaces associated with the processes of FIGS. 9-9B.
Figure 10A:
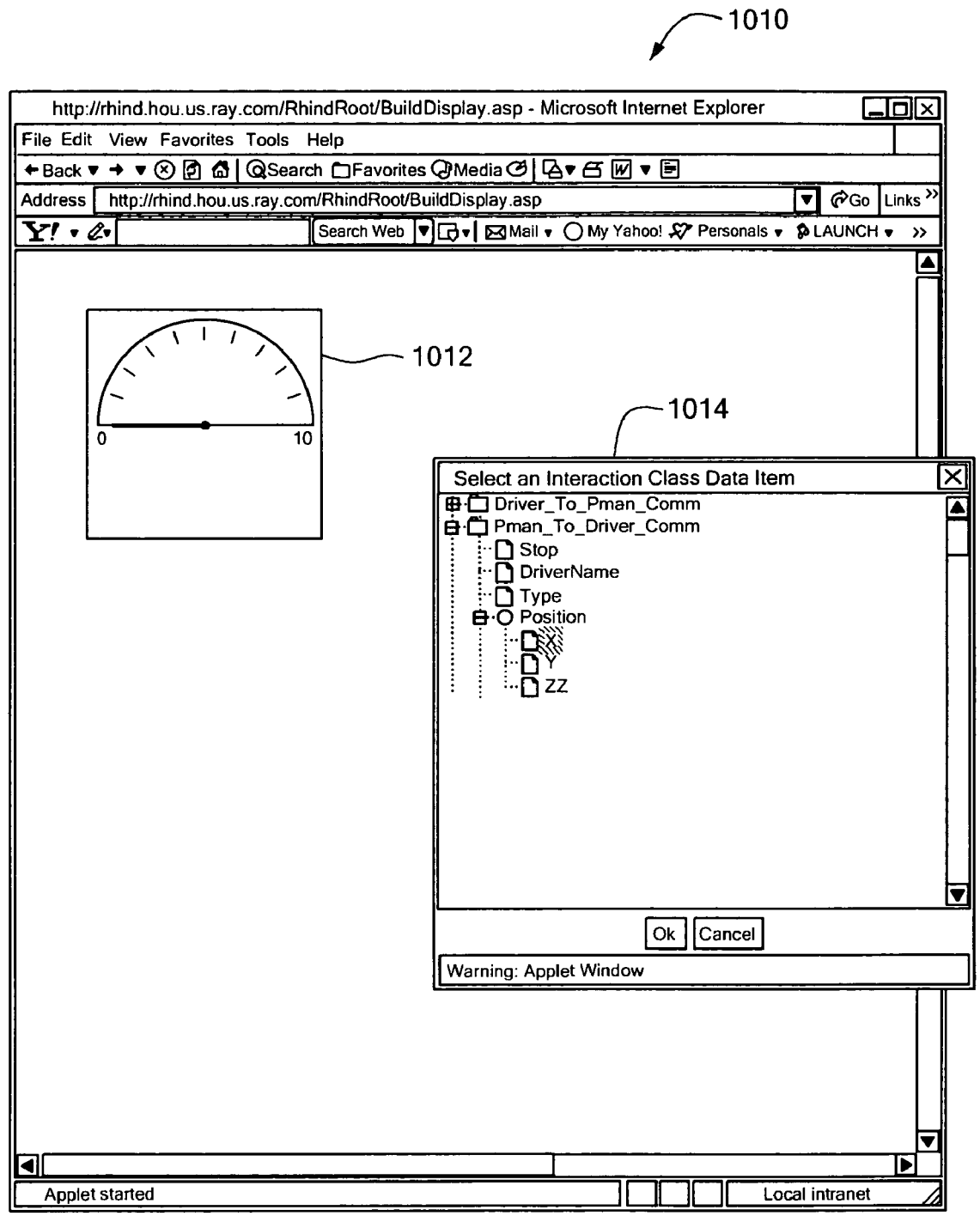
Figure 10B:
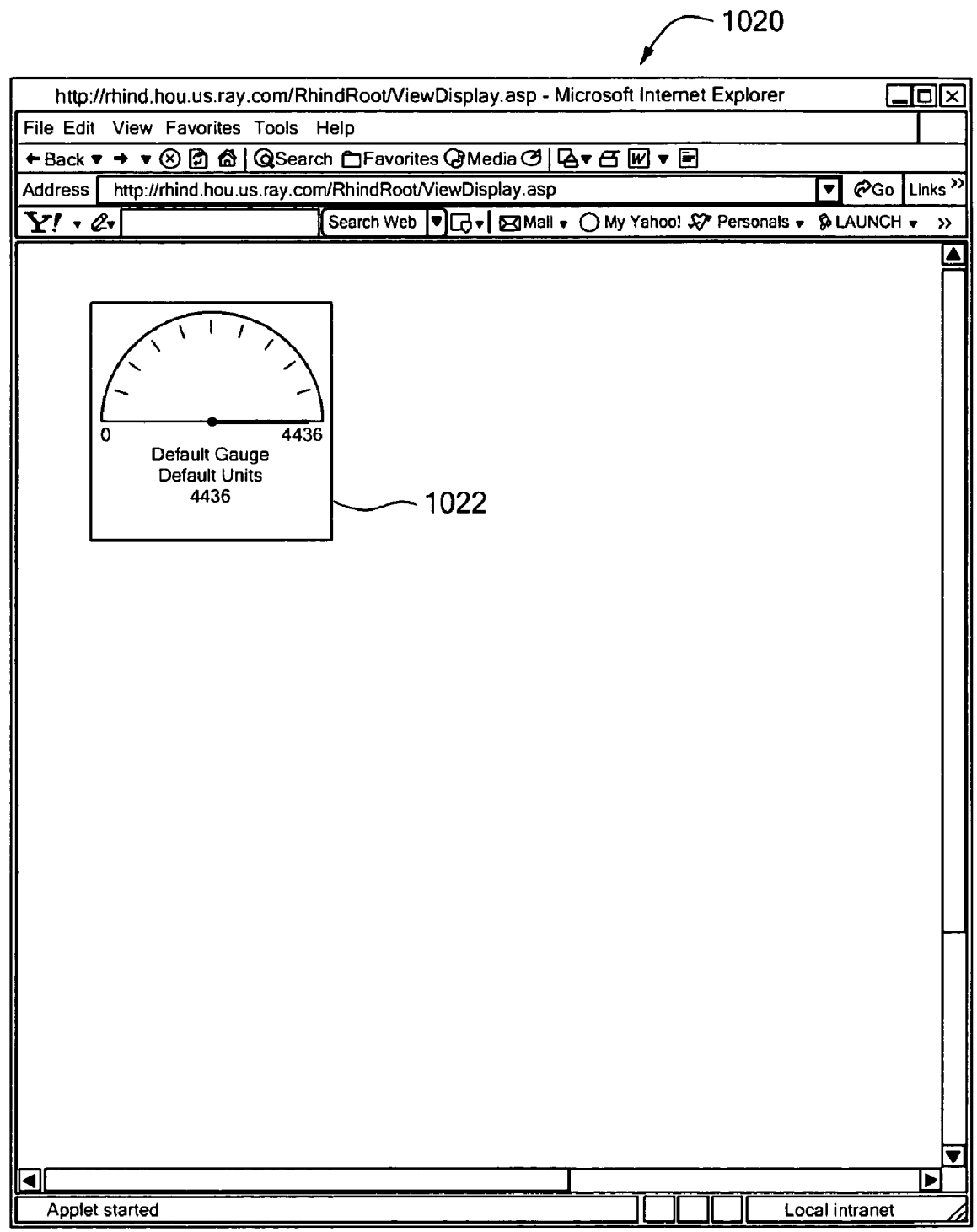
Figure 10C:
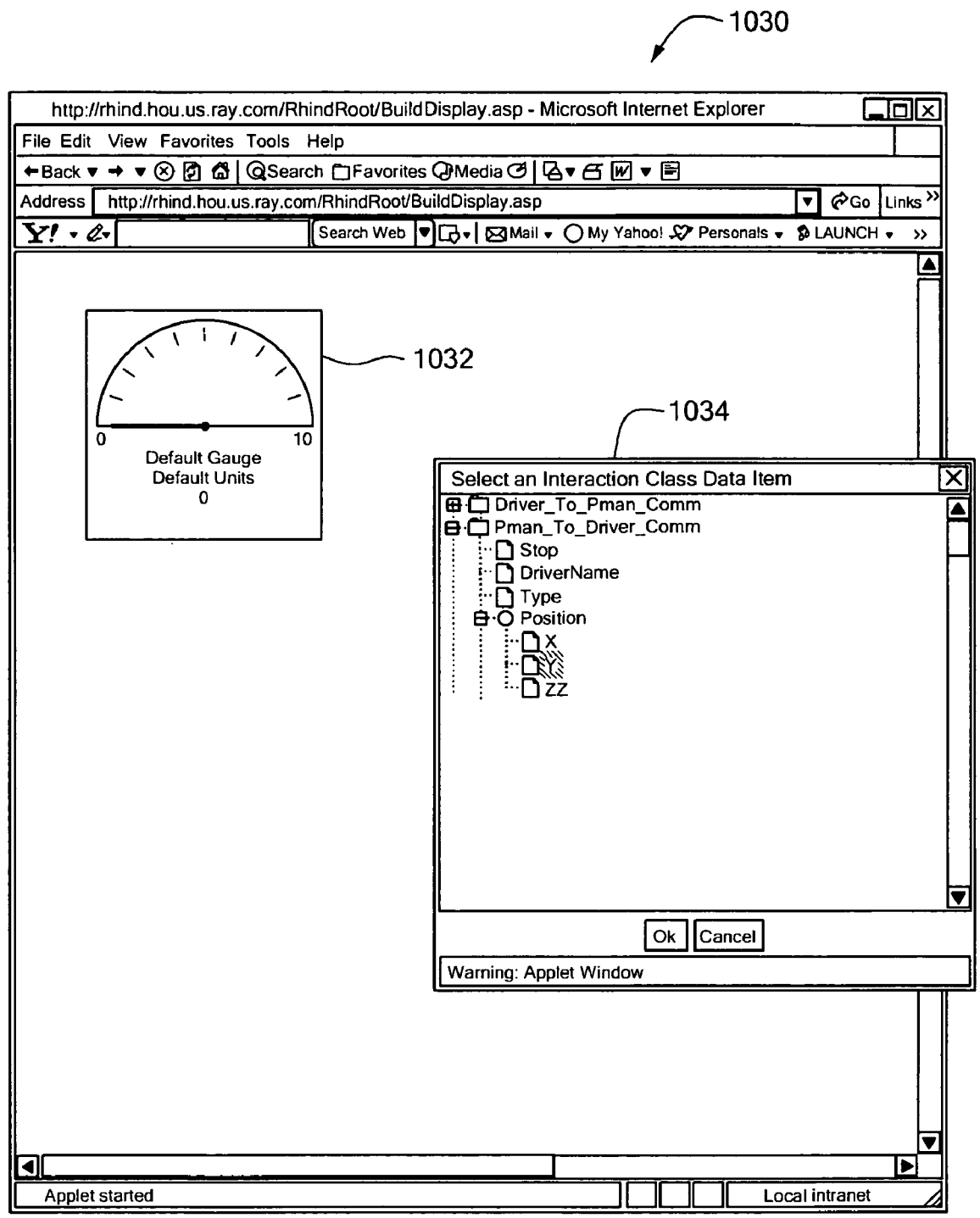
Figure 10D:
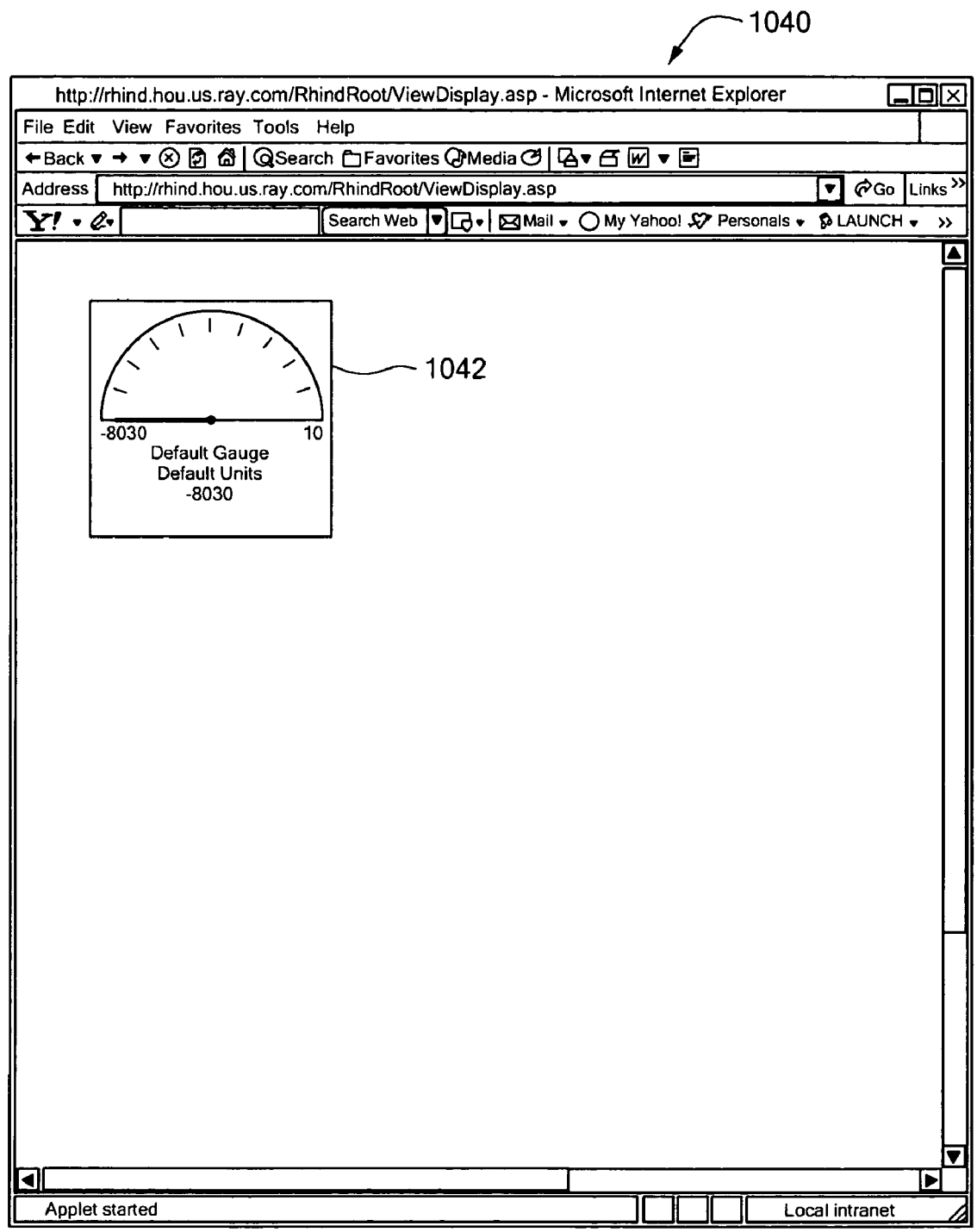

FIGS. 10-10D show graphical user interfaces according to the processes of FIGS. 9-9B.

Referring first to FIG. 10, an exemplary graphical user interface 1000 includes a display element 1002, which is a dial gauge. The display element 1002 has no associated data, as would be provided, for example, at blocks 910 of FIG. 9.

Referring now to FIG. 10A, another exemplary graphical user interface 1010 includes a display element 1012, which is a dial gauge, and a menu 1014. The menu provides a list interaction class parameters as would be provided, for example, at block 914 of FIG. 9. In this example, the interaction class parameters correspond to positions (X, Y, ZZ) at which a police to driver communication (Pman_To_Driver_Comm, an interaction class) occur in an HLA federation execution. The user can select an interaction class parameter, here position X, for example, at block 916 of FIG. 9.

Referring now to FIG. 10B, another exemplary graphical user interface 1020 includes a display element 1022, which is a dial gauge. The display element 1022 now shows data corresponding to an interaction parameter value for the selected interaction class parameter (position X), selected in the menu 1014 of FIG. 10A. In this example, the interaction parameter value includes a position 4436 (in arbitrary units).

The displayed interaction parameter value in the display element 1022 corresponds to block 920 of FIG. 9. It should be recognized that the interaction parameter value is provided in the display element 1022 while the HLA federation executes.

Referring now to FIG. 10C, another exemplary graphical user interface 1030 includes a display element 1032, which is a dial gauge, and a menu 1034. The menu 1034 again provides the list of interaction class parameters (e.g., menu 1014, FIG. 10A) as would be provided, for example, at block 914 of FIG. 9. In this example, the interaction class parameters again correspond to positions (X, Y, ZZ) at which a police to driver communication (Pman_To_Driver_Comm, an interaction class) occurred in an HLA federation execution. The user can select an interaction class parameter, here position Y, for example, at block 916 of FIG. 9.

Referring now to FIG. 10D, another exemplary graphical user interface 1040 includes a display element 1042, which is a dial gauge. The display element 1042 now shows another interaction parameter value, for the interaction class parameter Y selected in the menu 1034 of FIG. 10C. In this example, the interaction parameter value includes a position −8030 (in arbitrary units).

The displayed interaction parameter value in the display element 1042 corresponds to block 920 of FIG. 9. It should be recognized that the interaction parameter value (position) is again provided in the display element 1042 while the HLA federation executes.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of providing a display associated with a high level architecture (HLA) federation execution corresponding to a simulation, the method comprising:
   (a) generating an HLA federate;
   (b) joining the HLA federate to the HLA federation execution;
   (c) subscribing, using the HLA federate, while the federation executes, to receive HLA-federation-execution data including at least one of object classes, object instances, object class attributes, object attribute values, interaction classes, interaction class parameters, interaction parameter values, or interaction occurrence data sets;
   (d) receiving the HLA-federation-execution data while the HLA federation continues to execute;
   (e) generating a display element;
   (f) selecting, at a first time, while the HLA federation continues to execute, a first one of an object instance, an object class attribute, an interaction class, or an interaction class parameter from among the HLA-federation-execution data;
   (g) displaying a first at least one of an object attribute value, an interaction parameter value, or an interaction occurrence data set from among the HLA-federation-execution data with the display element in response to the (f) selecting the first one, while the HLA federation continues to execute;
   (h) selecting, at a second different time, while the HLA federation continues to execute, a second one of an object instance, an object class attribute, an interaction class, or an interaction class parameter from among the HLA-federation-execution data; and
   (i) displaying a second at least one of an object attribute value, an interaction parameter value, or an interaction occurrence data set from among the HLA-federation-execution data with the display element in response to the (h) selecting the second one, while the HLA federation continues to execute.

2. The method of claim 1, wherein the subscribing comprises:
   subscribing to an object class attribute associated with the HLA federation execution.

3. The method of claim 2, wherein the receiving the HLA-federation-execution data comprises:
   receiving RTI object instance discoveries associated with the subscribed object class attribute;
   building an object instance list associated with the RTI object instance discoveries.

4. The method of claim 1, wherein the display element is selected from among a dial gauge, a bar gauge, a line chart, a pie chart, a spreadsheet cell, and a text box.

5. The method of claim 1, wherein the selecting the first one comprises selecting a first object instance and the selecting the second one comprises selecting a second object instance from among the HLA-federation-execution data.

6. The method of claim 5, wherein the displaying the first at least one comprises displaying a first object attribute value associated with the first selected object instance and the displaying the second at least one comprises displaying a second object attribute value associated with the second selected object instance.

7. The method of claim 1, wherein the selecting the first one comprises selecting a first object class attribute and the selecting the second one comprises selecting a second object class attribute from among the HLA-federation-execution data.

8. The method of claim 7, wherein the displaying the first at least one comprises displaying a first object attribute value associated with the first selected object class attribute and the displaying the second at least one comprises displaying a second object attribute value associated with the second selected object class attribute.

9. The method of claim 1, wherein the subscribing comprises subscribing to an interaction class associated with the HLA federation execution.

10. The method of claim 9, wherein the receiving the HLA-federation-execution data comprises:
    receiving an interaction occurrence associated with the interaction class; and
    receiving at least one of an interaction occurrence data set and an interaction parameter value associated the interaction occurrence.

11. The method of claim 1, wherein the selecting the first one comprises selecting a first interaction class and the selecting the second one comprises selecting a second interaction class from among the HLA-federation-execution data.

12. The method of claim 11, wherein the displaying the first at least one comprises displaying a first interaction occurrence data set associated with the first selected interaction class and the displaying the second at least one comprises displaying a second interaction occurrence data set associated with the second selected interaction class.

13. The method of claim 1, wherein the selecting the first one comprises selecting a first interaction class parameter and the selecting the second one comprises selecting a second interaction class parameter from among the HLA-federation-execution data.

14. The method of claim 13, wherein the displaying the first at least one comprises displaying a first interaction parameter value associated with the first selected interaction class parameter and the displaying the second at least one comprises displaying a second interaction parameter value associated with the second selected interaction class parameter.

15. A system to provide a display associated with a high level architecture (HLA) federation execution corresponding to a simulation, comprising:
    a web interaction federate adapted to join the federation and to dynamically subscribe to the federation while the federation executes, to receive HLA-federation-execution data including at least one of object classes, object instances, object class attributes, object attribute values, interaction classes, interaction class parameters, interaction parameter values, or interaction occurrence data sets while the HLA federation continues to execute;
    a web client application adapted to provide a dynamic selection of at least one of an object instance, an object class attribute, an interaction class, or an interaction class parameter from among the HLA-federation-execution data while the HLA federation continues to execute and, in response to the dynamic selection, to provide an associated dynamic display of at least a portion of the HLA-federation-execution data while the HLA federation continues to execute; and a server coupled between the web interaction federate and the web client application, wherein the server is adapted to provide the at least a portion of the HLA-federation-execution data to the web client application.

16. The system of claim 15, further including a graphical user interface coupled to the web client application to display the at least a portion of the HLA-federation-execution data while the HLA federation continues to execute.

17. The system of claim 16, wherein the graphical user interface includes a display element selected from among a dial gauge, a bar gauge, a line chart, a pie chart, a spreadsheet cell, or a text box, wherein the display element is to dynamically display the at least a portion of the HLA-federation-execution data while the HLA federation continues to execute.

18. The system of claim 17, wherein the display element includes a display of at least one of an object class, an object instance, or an object class attribute, and also an object attribute value.

19. The system of claim 17, wherein the display element includes a display of at least one of an interaction class, or an interaction class parameter, and also an interaction occurrence data set or an interaction parameter value.

20. The system of claim 16, wherein the graphical user interface includes a selection window adapted to select an object instance to display an object attribute value associated with the selected object instance and adapted to select another object instance to display another object attribute value associated with the selected another object instance while the HLA federation continues to execute.

21. The system of claim 16, wherein the graphical user interface includes a selection window adapted to select an object class attribute to display an object attribute value associated with the selected object class attribute and adapted to select another object class attribute to display another object attribute value associated with the selected another object class attribute while the HLA federation continues to execute.

22. The system of claim 16, wherein the graphical user interface includes a selection window adapted to select an interaction class to display an interaction occurrence data set associated with the selected interaction class and adapted to select another interaction class to display an another interaction occurrence data set associated with the selected another interaction class while the HLA federation continues to execute.

23. The system of claim 16, wherein the graphical user interface includes a selection window adapted to select an interaction class parameter to display an interaction parameter value associated with the selected an interaction class parameter and adapted to select another an interaction class parameter to display an another interaction parameter value associated with the selected another an interaction class parameter while the HLA federation continues to execute.

24. The system of claim 17, wherein the displayed at least a portion of the HLA-federation-execution data includes at least one of an object attribute value, an interaction parameter value, or an interaction occurrence data set.

25. The method of claim 1, wherein the subscribing comprises dynamically subscribing to and unsubscribing from the federation as the federation continues to execute.

26. The method of claim 25, wherein each subscribing results in new HLA-federation-execution data.

27. The method of claim 1, further comprising:
unsubscribing from the federation while the federation continues to execute; and
re-subscribing, using the HLA federate, while the federation continues to execute, to receive different HLA-federation-execution data, including a different at least one of object classes, object instances, object class attributes, object attribute values, interaction classes, interaction class parameters, interaction parameter values, or interaction occurrence data set.

28. The method of claim 27, wherein the selecting, at the first time, comprises:
selecting a first data type selected from among an object instance data type, an object class attribute data type, an interaction class data type, or an interaction class parameter data type, and selecting, at the first time, while the HLA federation continues to execute, in accordance with the first data type, the first one of the object instance, the object class attribute, the interaction class, or the interaction class parameter from among the HLA-federation-execution data, and wherein the selecting, at the second different time, comprises:
selecting a second different data type selected from among an object instance data type, an object class attribute data type, an interaction class data type, or an interaction class parameter data type, and selecting, at the second different time, while the HLA federation continues to execute, in accordance with the second different data type, the second one of the object instance, the object class attribute, the interaction class, or the interaction class parameter from among the different HLA-federation-execution data.

29. The system of claim 15, wherein the web interaction federate is adapted to join the federation and to dynamically subscribe to and unsubscribe from the federation while the federation continues to execute.

* * * * *

UNITED STATES PATENT AND TRADEMARK OFFICE
CERTIFICATE OF CORRECTION

PATENT NO. : 7,512,526 B2
APPLICATION NO. : 11/065615
DATED : March 31, 2009
INVENTOR(S) : Allen et al.

It is certified that error appears in the above-identified patent and that said Letters Patent is hereby corrected as shown below:

Col. 1, line 23, delete "objects models" and replace with -- object models --.

Col. 1, line 40, delete ". It is be" and replace with -- . It is --.

Col. 2, line 7, delete "call" and replace with -- called --.

Col. 6, line 23, delete "that that the" and replace with -- that the --.

Col. 9, line 25, delete "displayed block 214." and replace with -- displayed. --.

Col. 9, line 47, delete "or a another" and replace with -- or another --.

Col. 9, line 49-50, delete "displayed block 214." and replace with -- displayed. --.

Col. 11, line 39, delete "reference I-N" and replace with -- reference designators I-N --. (check)

Col. 14, line 45, delete "attributes," and replace with -- attribute, --.

Col. 16, line 17, delete "a list interaction" and replace with -- a list of interaction --.

Col. 18, line 4, delete "form" and replace with -- from --.

Col. 18, line 15, delete "servers" and replace with -- server --.

Col. 18, line 32, delete "blocks 910" and replace with -- block 910 --.

Col. 18, line 35-36, delete "list interaction" and replace with -- list of interaction --.

Col. 20, line 32, delete "associated the" and replace with -- associated with the --.

Col. 21, line 49, delete "display an another" and replace with -- display another --.

UNITED STATES PATENT AND TRADEMARK OFFICE
CERTIFICATE OF CORRECTION

PATENT NO. : 7,512,526 B2
APPLICATION NO. : 11/065615
DATED : March 31, 2009
INVENTOR(S) : Allen et al.

It is certified that error appears in the above-identified patent and that said Letters Patent is hereby corrected as shown below:

Col. 22, line 2, delete "selected an interaction" and replace with -- selected interaction --.

Col. 22, line 3, delete "another an interaction" and replace with -- another interaction --.

Col. 22, line 4, delete "display an another" and replace with -- display another --.

Col. 22, line 5, delete "another an interaction" and replace with -- another interaction --.

Col. 22, line 25, delete "set." and replace with -- sets. --.

Signed and Sealed this

Thirtieth Day of June, 2009

JOHN DOLL
*Acting Director of the United States Patent and Trademark Office*